US012103008B2

(12) United States Patent
Teng et al.

(10) Patent No.: US 12,103,008 B2
(45) Date of Patent: Oct. 1, 2024

(54) METHODS AND APPARATUSES FOR BALL MILLING TO PRODUCE POWDER FOR ADDITIVE MANUFACTURING

(71) Applicant: Divergent Technologies, Inc., Los Angeles, CA (US)

(72) Inventors: Alex Teng, Gardena, CA (US); Chan Cheong Pun, Gardena, CA (US); Prabir Chaudhury, Gardena, CA (US); Michael Thomas Kenworthy, Los Angeles, CA (US); Narender Lakshman, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 20 days.

(21) Appl. No.: 17/481,239

(22) Filed: Sep. 21, 2021

(65) Prior Publication Data
US 2022/0088608 A1 Mar. 24, 2022

Related U.S. Application Data

(60) Provisional application No. 63/081,806, filed on Sep. 22, 2020.

(51) Int. Cl.
*B02C 17/00* (2006.01)
*B02C 17/06* (2006.01)
(Continued)

(52) U.S. Cl.
CPC ............ *B02C 17/161* (2013.01); *B02C 17/06* (2013.01); *B02C 17/10* (2013.01);
(Continued)

(58) Field of Classification Search
CPC ....... B02C 17/183; B02C 17/24; B02C 17/06; B02C 17/1815; B02C 17/20
See application file for complete search history.

(56) References Cited

U.S. PATENT DOCUMENTS 1,125,921 A * 1/1915 Atkins .................... B02C 17/06
241/153
1,185,342 A * 5/1916 O'Shaughnessy ...... B02C 17/06
241/153
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

*Primary Examiner* — Faye Francis
(74) *Attorney, Agent, or Firm* — ARENTFOX SCHIFF LLP

(57) ABSTRACT

An apparatus for producing spherical metallic powders through continuous ball milling. The apparatus includes a comminution component. The comminution component includes an inlet to receive a metallic material at a first region within the comminution component and an outlet to dispense the metallic powder from a second region within the comminution component. The apparatus includes a plurality of grinding components to grind the metallic material, the plurality of grinding components being arranged within the comminution component. The apparatus includes a drive component, connected with the comminution component, to induce movement of the metallic material and the plurality of grinding components within the comminution component such that the metallic material is fragmented through contact with the plurality of grinding components at the first region and an external surface of the fragmented metallic material is altered at the second region to produce the metallic powder.

42 Claims, 11 Drawing Sheets

(51) Int. Cl.
*B02C 17/10* (2006.01)
*B02C 17/16* (2006.01)
*B02C 17/18* (2006.01)
*B02C 17/20* (2006.01)
*B02C 17/24* (2006.01)
*B22F 9/04* (2006.01)
*B02C 18/16* (2006.01)
*B33Y 40/10* (2020.01)

(52) U.S. Cl.
CPC ........ *B02C 17/1815* (2013.01); *B02C 17/183* (2013.01); *B02C 17/20* (2013.01); *B02C 17/24* (2013.01); *B22F 9/04* (2013.01); *B02C 2018/168* (2013.01); *B22F 2009/043* (2013.01); *B33Y 40/10* (2020.01)

(56) References Cited

U.S. PATENT DOCUMENTS

| | | | |
|---|---|---|---|
| 1,246,775 A * | 11/1917 | Mushett | B02C 17/1855 241/70 |
| 1,361,205 A * | 12/1920 | Van Zandt | B02C 17/06 241/72 |
| 1,361,281 A * | 12/1920 | Newhouse | B02C 17/06 241/70 |
| 1,394,334 A * | 10/1921 | Newhouse | B02C 17/06 241/70 |
| 1,427,234 A * | 8/1922 | Sherban | B02C 17/06 241/49 |
| 1,513,952 A * | 11/1924 | Apted | B02C 17/06 241/137 |
| 1,587,769 A * | 6/1926 | Fisher | B02C 17/06 241/72 |
| 1,591,941 A * | 7/1926 | Newhouse | B02C 17/06 241/72 |
| 1,598,933 A * | 9/1926 | Read | B02C 17/06 241/72 |
| 1,683,627 A * | 9/1928 | Read | B02C 17/06 241/72 |
| 1,692,974 A * | 11/1928 | Barker | B02C 17/06 241/105 |
| 1,710,659 A * | 4/1929 | Greisen | B02C 17/06 241/153 |
| 1,739,855 A * | 12/1929 | Newhouse | B02C 17/06 241/78 |
| 1,788,825 A * | 1/1931 | Danks | B02C 15/00 241/153 |
| 2,131,260 A * | 9/1938 | Temple | B24B 31/02 451/328 |
| 2,160,169 A * | 5/1939 | Pontoppidan | B02C 17/06 422/209 |
| 2,256,841 A * | 9/1941 | Hardinge | B02C 17/04 241/179 |
| 3,314,614 A * | 4/1967 | Daniel | G05D 7/0605 241/34 |
| 3,459,380 A * | 8/1969 | Kartman | B02C 17/06 241/43 |
| 3,624,797 A * | 11/1971 | Waddell | B02C 17/06 241/23 |
| 3,856,214 A * | 12/1974 | Kaltenbach | B02C 25/00 241/34 |
| 3,949,940 A * | 4/1976 | Horning | B02C 17/06 241/176 |
| 3,964,717 A * | 6/1976 | Hansen | B02C 17/06 241/70 |
| 4,026,479 A * | 5/1977 | Bradburn | B02C 25/00 241/33 |
| 4,303,205 A * | 12/1981 | Geiger | B02C 25/00 241/23 |
| 4,469,282 A | 9/1984 | Booz | |
| 4,949,907 A * | 8/1990 | Bogdanov | B02C 17/06 241/176 |
| 5,203,226 A | 4/1993 | Hongou et al. | |
| 5,328,501 A | 7/1994 | McCormick et al. | |
| 5,702,060 A | 12/1997 | Matteazzi et al. | |
| 5,716,013 A * | 2/1998 | Benson | B02C 17/007 241/38 |
| 5,742,385 A | 4/1998 | Champa | |
| 5,865,385 A * | 2/1999 | Arnett | C21D 1/18 241/182 |
| 5,990,444 A | 11/1999 | Costin | |
| 6,010,085 A | 1/2000 | Angeletakis | |
| 6,010,155 A | 1/2000 | Rinehart | |
| 6,086,242 A | 7/2000 | Rajamani et al. | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,827,303 B2 * | 12/2004 | Yanase | B02C 17/186 241/72 |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,152,819 B2 * | 12/2006 | Ford | B02C 17/186 241/23 |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,767,151 B2 | 8/2010 | Downs | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |

(56) References Cited

U.S. PATENT DOCUMENTS

| | | |
|---|---|---|
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |

(56) References Cited

U.S. PATENT DOCUMENTS

| | | | |
|---|---|---|---|
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2003/0006329 A1* | 1/2003 | Yanase ............... B02C 17/163 |
| | | 241/172 |
| 2003/0226920 A1* | 12/2003 | Yanase ............... B02C 17/06 |
| | | 241/171 |
| 2004/0177723 A1* | 9/2004 | Van Daam ........... B02C 19/186 |
| | | 75/354 |
| 2005/0258288 A1* | 11/2005 | Dalziel ............... B02C 17/16 |
| | | 241/172 |
| 2006/0108783 A1 | 5/2006 | Ni et al. |
| 2013/0153694 A1* | 6/2013 | Held ..................... G05B 15/02 |
| | | 241/34 |
| 2014/0277669 A1 | 9/2014 | Nardi et al. |
| 2016/0067716 A1 | 3/2016 | Blanchard et al. |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |

(56) References Cited

FOREIGN PATENT DOCUMENTS

| | | |
|---|---|---|
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/2021/51380, Feb. 14, 2022.

* cited by examiner

METHODS AND APPARATUSES FOR BALL MILLING TO PRODUCE POWDER FOR ADDITIVE MANUFACTURING

BACKGROUND

Field

The present disclosure generally relates to milling, and more particularly, to techniques for a continuous ball milling machine that produces powders for metal additive manufacturing.

Introduction

Additive manufacturing (AM) refers to various processes for fabrication of solid three-dimensional (3-D) objects. Thus, AM includes 3-D printing techniques. Many AM processes fabricate objects from metallic powders. For use in many AM processes, however, metallic powders may be expected to be within a very small and specific size range. In addition, many AM processes may be adapted to use metallic powders of specific shapes, such as substantially spherical metallic powders. Such characteristics may be difficult to achieve.

Some approaches to creating metallic powders involve gas atomization, in which a gas is used to atomize a liquid stream of metal. However, gas atomization may be inefficient and/or otherwise undesirable due to cost and/or energy expenditures. For example, as gas atomization uses a liquid stream of metal, metal that has already been smelted must be melted again in order to produce metallic powder. In addition, gas itself has a poor transfer of momentum to a liquid stream of metal, which may cause potential energy in the gas to be inefficiently converted to velocity rather than transferred into the liquid stream of metal. Further, the energy present in the gas temperature and velocity are generally unrecoverable.

Consequently, gas atomization may be an unsatisfactory approach to creating metallic powders.

SUMMARY

A need exists for approaches to efficiently producing metallic powders that are suitable for use in some, many, or all powder-based metal additive manufacturing (AM) processes (e.g., Direct Metal Deposition (DMD), Powder Bed Fusion (PBF)). The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

AM processes involve the use of a stored geometrical model for accumulating layered materials on a "build plate" to produce three-dimensional (3-D) objects having features defined by the model. AM techniques are capable of printing complex components using a wide variety of materials. A 3-D object is fabricated based on a computer aided design (CAD) model. The AM process can create a solid three-dimensional object using the CAD model.

One such method is called Direct Metal Deposition (DMD). DMD is an AM technology that uses a laser to melt metallic powder and thereby transform it into a solid metal object. Unlike many of the other AM technologies, DMD is not based on a powder bed. Instead, DMD uses a feed nozzle to propel the powder into the laser beam. The powdered metal is then fused by the laser. While supports or a freeform substrate may in some cases be used to maintain the structure being built, almost all the powder in DMD is transformed into solid metal and consequently little waste powder is left to recycle. Using a layer by layer strategy, the print head, composed of the laser beam and the feed nozzle, can scan the substrate to deposit successive layers. All kinds of metallic materials can be processed using this technology including, for example, steel, aluminum, nickel alloys, titanium, cobalt, copper, and the like.

Other AM processes, such as powder bed fusion (PBF), may use a laser to sinter or melt metallic powder deposited in a powder bed, which then bonds the powder particles together in targeted areas to produce a 3-D structure having the desired geometry. For example, selective laser sintering (SLS) uses a laser to sinter metallic powder as the surface of a powder bed is scanned across. The laser is directed at specific points defined by a CAD model, and the metallic powder is bound together at the specific points to create a sold structure. Similar to SLS, selective laser melting (SLM) uses a high power-density laser to melt and fuse metallic powder. In SLM, however, the metallic powder may be fully melted into a solid 3-D part.

The metallic powders used in various AM processes, such as SLS and/or SLM, may be necessarily within a well-defined size distribution—e.g., 10 micrometers ($\mu m$) to 100 $\mu m$. In addition, such AM processes may use metallic powders with a specific shape—e.g., substantially spherical metal powder. Controlling metallic powders for relative consistency (e.g., including size and shape characteristics) may provide for reproducibility and/or quality assurance in AM processes.

The present disclosure describes various techniques and solutions to creating metallic powder suitable for AM processes through a ball milling machine, which may be continuous and may include multiple different media. According to the techniques and solutions described herein, ball milling utilizes solid media (e.g., "balls") to refine particle sizes to achieve near-spherical powder, e.g., in a manner that is appreciably more efficient in terms of cost and efficiency than gas atomization, given that melting is avoided. Further, ball milling techniques and solutions of the present disclosure may occur at temperatures that reduce (or preclude) dangerous conditions, such as those present during gas atomization. The metallic powders may be of aluminum or aluminum alloys, although other types of metals and alloys may also be powdered for use in AM processes.

In addition, ball milling techniques and solutions of the present disclosure may provide the possibility to re-alloy materials on an ongoing basis. Advantageously, metallic powder can be recycled in ball milling. For example, rejected and/or missed metallic powders and metals (e.g., from cleaned or sorting parts of various geometries) can be directly fed back into the input of the ball milling machine, including metal support material, over/undersized powder rejected in quality assurance/quality control processes, failed part builds, machining chips, powder from cleaning and/or de-powdering operations, and/or other sources of metals.

According to some embodiments of the present disclosure, methods and apparatuses for efficiently creating metallic powder that is sufficiently spherical for use in some AM processes are described using continuous ball milling machines. Such continuous ball milling machines of the present disclosure may include an inlet or other entrance point in which metallic pellets or other shaped metal can be fed. Further, continuous ball milling machines described herein may include a dispenser or other exit point at which metallic powder within a defined size distribution and defined morphology is collected, e.g., with or without additional operations preparing the metallic powder for use in some AM processes.

In some embodiments of the present disclosure, an apparatus for producing a metallic powder through grinding is described. The apparatus comprises a comminution component including an inlet to receive a metallic material at a first region within the comminution component and an outlet to dispense the metallic powder from a second region within the comminution component. The apparatus further comprises a plurality of grinding components to grind the metallic material, the plurality of grinding components being arranged within the comminution component. In addition, the apparatus comprises a drive component, connected with the comminution component, to induce movement of the metallic material and the plurality of grinding components within the comminution component such that the metallic material is fragmented through contact with the plurality of grinding components at the first region within the comminution component and an external surface of the fragmented metallic material is altered at the second region within the comminution component to produce the metallic powder.

In one embodiment, the plurality of grinding components comprises a set of first grinding components and a set of second grinding components, and each first grinding component has at least a greater weight or a larger dimension than each second grinding component. In another embodiment, the first grinding components are comprised of a different material than the second grinding components. In still another embodiment, the set of first grinding components is spatially separated from the set of second grinding components within the comminution component. In a further embodiment, an interior of the comminution component is configured with one of a conical shape or geometric walls to spatially separate the first set of grinding components from the second set of grinding components.

In one embodiment, the comminution component is configured such that a first temperature at the first region is different by at least 20 degrees Celsius (° C.) than a second temperature at the second region. In a further embodiment, the first temperature is less than or equal to −100° C., and the second temperature is greater than or equal to 100° C. In another embodiment, the drive component comprises at least one shaft defining an axis of rotation of the comminution component. In yet a further embodiment, an aspect ratio of the at least one shaft is different at the first region than at the second region.

In one embodiment, the comminution component is configured to receive at least one additive at the first region or the second region. In a further embodiment, the at least one additive is configured to prevent welding of the metallic powder, prevent coagulation of the metallic powder, lubricate the metallic powder, modulate impact frequency of the metallic powder, increase energy transfer of the metallic powder, or prevent chemical hardening of the metallic powder. In still another embodiment, each grinding component comprises a ball having a diameter inclusively between 1 millimeter (mm) and 40 mm.

In one embodiment, the apparatus further comprises one or more filters or sieves between the first region and the second region, the one or more filters or sieves being configured to allow the fragmented metallic material to pass from one of the first region or the second region toward another of the first region or the second region and being further configured to prevent at least one grinding component from passing from one of the first region or the second region toward another of the first region or the second region.

In one embodiment, the apparatus further comprises a set of arms arranged within the comminution component and configured to affect at least force or frequency of contact between at least a portion of the plurality of grinding components and the fragmented metallic material. In a further embodiment, each arm is connected with at least the drive component or interior surface of the comminution component, and each arm is configured to rotate to affect the at least the force or the frequency of the contact between the at least the portion of the plurality of grinding components and the fragmented metallic material.

In some other embodiments of the present disclosure, a ball mill is described. The ball mill comprises a first mill section containing first grinding media configured to strike metallic chips to obtain metallic granules. The ball mill further comprises a second mill section containing second grinding media configured to configured strike the metallic granules to obtain metallic powder, the second grinding media being configured to strike the metallic granules with a greater frequency and lesser force than the first grinding media strikes the metallic chips. In addition, the ball mill comprises a dispensation section configured to dispense the metallic powder configured for use in additive manufacturing.

In one embodiment, the metallic powder is spherical with diameters inclusively between 10 μm and 100 μm. In another embodiment, each first and second grinding medium is spherical, and each first grinding medium has a diameter of at least 30 mm and each second grinding medium has a diameter of at most 5 mm. In still another embodiment, at least the first or second mill sections further contains at least one surfactant, lubricant, or abrasive.

In one embodiment, the ball mill further comprises at least one drive shaft configured to cause at least the first or second grinding media to strike the metallic chips or the metallic granules, respectively. In another embodiment, the ball mill further comprises a set of arms extending from the at least one drive shaft, the set of arms being configured to facilitate at least the first or second grinding media striking the metallic chips or the metallic granules, respectively. In a further embodiment, at least one of the set of arms is blade-shaped or triangular. In an additional embodiment, the at least one drive shaft comprises at least two drive shafts, each drive shaft being connected with a set of arms. In still another embodiment, the at least two drive shafts are configured to rotate at different speeds, and the sets of arms are different in at least size, shape, aspect ratio, or surface texture.

In still further embodiments of the present disclosure, a method of ball milling is described. The method of ball milling comprises receiving a metallic material at a first region of a comminution component. The method further comprises causing the metallic material to fragment through contact with a plurality of first grinding components at a first impact force and a first impact frequency. The method further comprises altering surface characteristics of the fragmented metallic material to obtain metallic powder through contact of the fragmented metallic material with a plurality of second grinding components at a second impact force lower than the first impact force and a second impact frequency higher than the first impact frequency. In addition, the method comprises outputting the metallic powder, the metallic powder being spherical with a diameter inclusively between 10 µm and 100 µm.

In one embodiment, the method further comprises driving rotation of a first set of arms, the metallic material being fragmented based on the rotation of the first set of arms; and driving rotation of a second set of arms, the surface characteristics of the fragmented metallic power being altered to obtain the metallic power based on the rotation of the second set of arms. In another embodiment, a speed of the rotation of the first set of arms is different from a speed of the rotation of the second set of arms, and the first set of arms is one of a different size or a different shape than the second set of arms.

In one embodiment, the method further comprises filtering the fragmented metallic material into position for the surface characteristics to be altered; and maintaining separation of the plurality of first grinding components and the plurality of second grinding components.

In one embodiment, the method further comprises providing at least one additive for one of the contact of the metallic material with the plurality of first grinding components or the contact of the fragmented metallic material with the plurality of second grinding components. In another embodiment, the at least one additive is configured to prevent welding of the metallic powder, prevent coagulation of the metallic powder, lubricate the metallic powder, modulate impact frequency of the metallic powder, increase energy transfer of the metallic powder, or prevent chemical hardening of the metallic powder.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
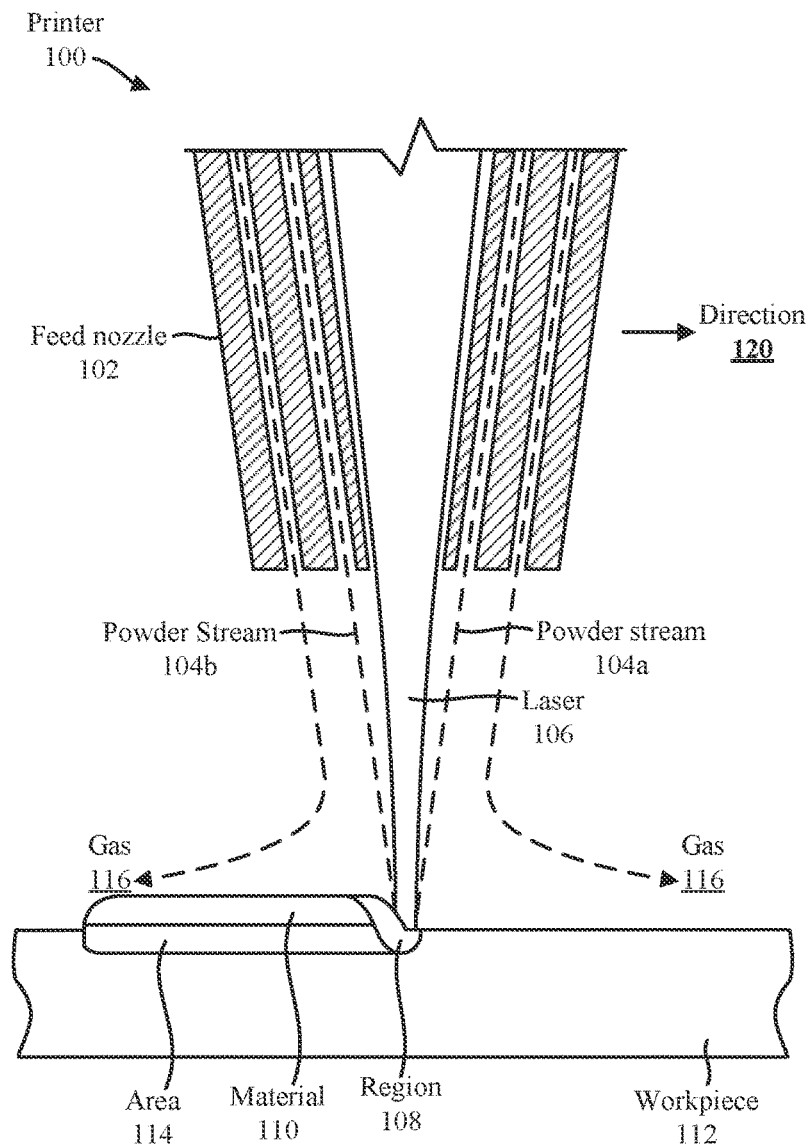
FIG. 1 illustrates an exemplary embodiment of certain aspects of a Direct Metal Deposition (DMD) three-dimensional (3-D) printer.

The detailed description set forth below in connection with the appended drawings is intended to provide a description of various exemplary embodiments and is not intended to represent the only embodiments within the scope of the present disclosure. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of that which is claimed herein to those skilled in the art. However, some embodiments of that which is claimed herein may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

This disclosure is generally directed to creating spherical metallic powders using ball milling machines. According to the present disclosure, a ball mill machine may be "continuous" in that metallic material (e.g., metallic parts or "chips") are input into the ball milling machine and the metallic material is continuously grinded at different regions of the ball milling machine until spherical metallic powder within a defined size range is output from the ball milling machine. Specifically, the different regions of the ball milling machine includes at least a first region including a first grinding media (e.g., "balls") and a second region including a second grinding media (e.g., relatively smaller balls).

In the first region, the metallic material is fragmented using the first grinding media, which is configured to strike the metallic material with a first impact force and a first impact frequency. In the second region, surface characteristics of the metallic material is altered (e.g., to be substantially spherical) using the second grinding media, which is configured to strike the metallic material with a second impact force lower than the first impact force and a second impact frequency greater than the first impact frequency.

Other regions in addition to the aforementioned first and second regions may be included in ball milling machines without departing from the scope of the present disclosure. Such other regions may be configured to fragment and/or alter surface characteristics of metallic material to create spherical metallic powders. For example, a third region may be positioned between the first and second regions, and the third region may include third grinding media of a size smaller than the first grinding media but larger than the second grinding media.

Manufacturers and various other entities stand to benefit from the ball milling techniques and solutions for creating spherical metallic powders described in this disclosure. Specifically, manufacturers and other entities involved in additive manufacturing (AM) and three-dimensional (3-D) printing. For example, metallic powders created using the techniques and solutions provided for in the present disclosure may be applicable in selective laser melting (SLM), selective laser sintering (SLS), and other powder-bed fusion (PBF)-based AM methods and practices. In some other examples, metallic powders created using the techniques and solutions provided for in the present disclosure may be applicable in Direct Metal Deposition (DMD) AM and/or other AM methods and practices.

In particular, the ball milling techniques and solutions described herein can create metallic powders suitable for AM and 3-D printing of virtually any mechanized form of transport, which often rely heavily on complex and labor intensive machine tools and molding techniques, and whose products often require the development of complex panels, nodes, structures, extrusions, and/or interconnects to be integrated with intricate machinery such as combustion engines, transmissions and increasingly sophisticated electronics. Examples of such transport structures include, among others, trucks, trains, tractors, boats, aircraft, motorcycles, busses, and the like.

Additive Manufacturing (3-D Printing).

AM is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
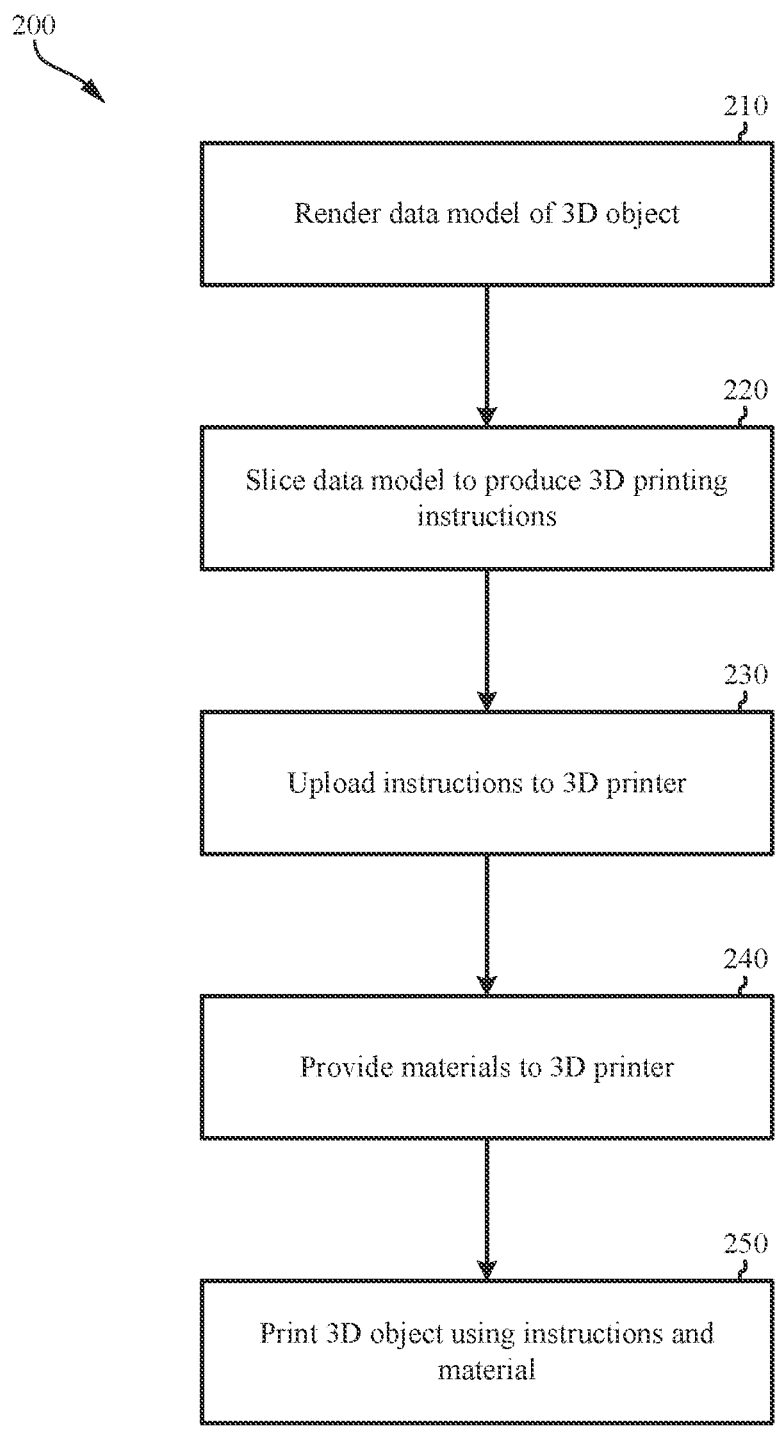
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In SLM, SLS, and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes PBF. Like DMD, PBF creates "build pieces" layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
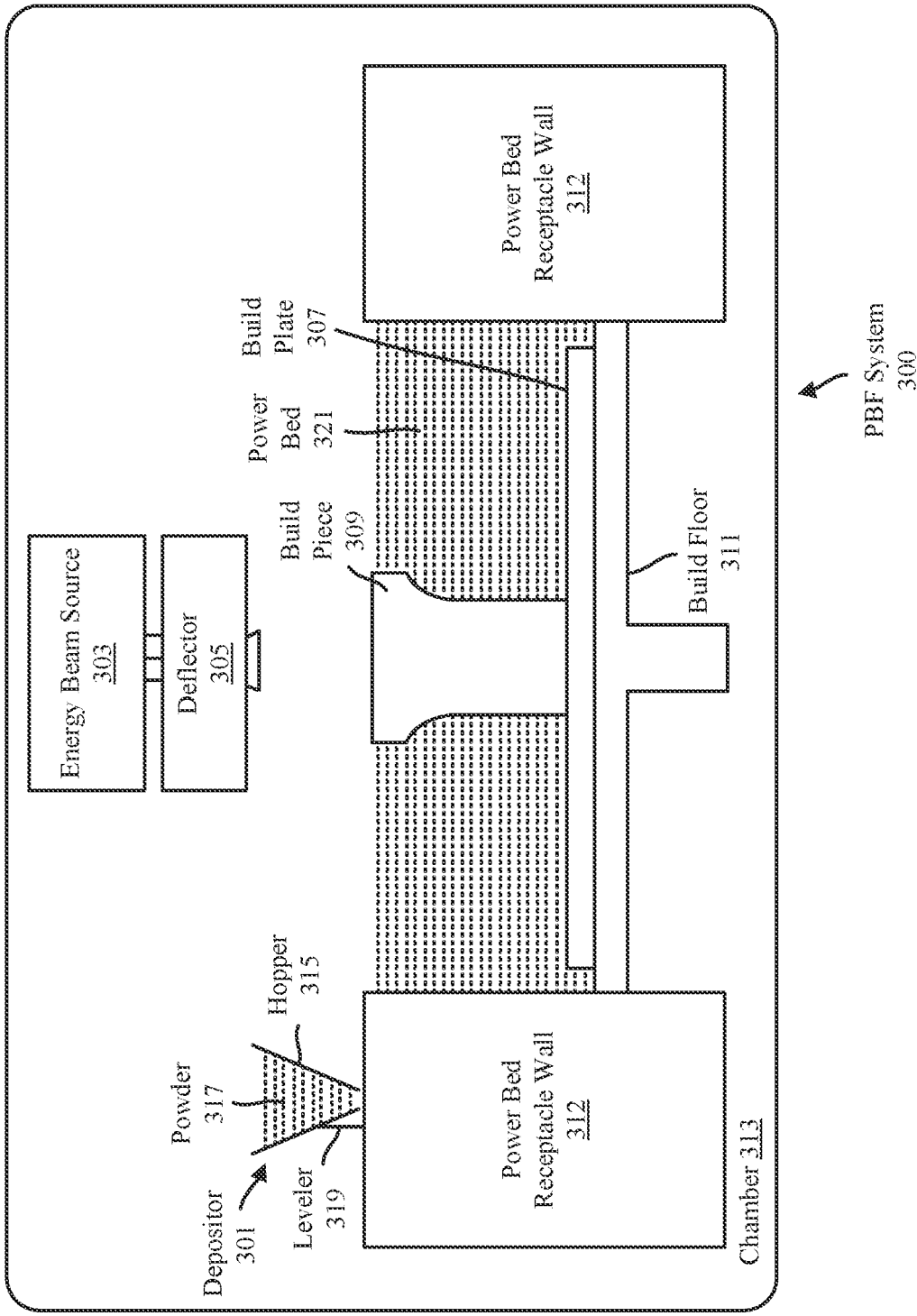
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
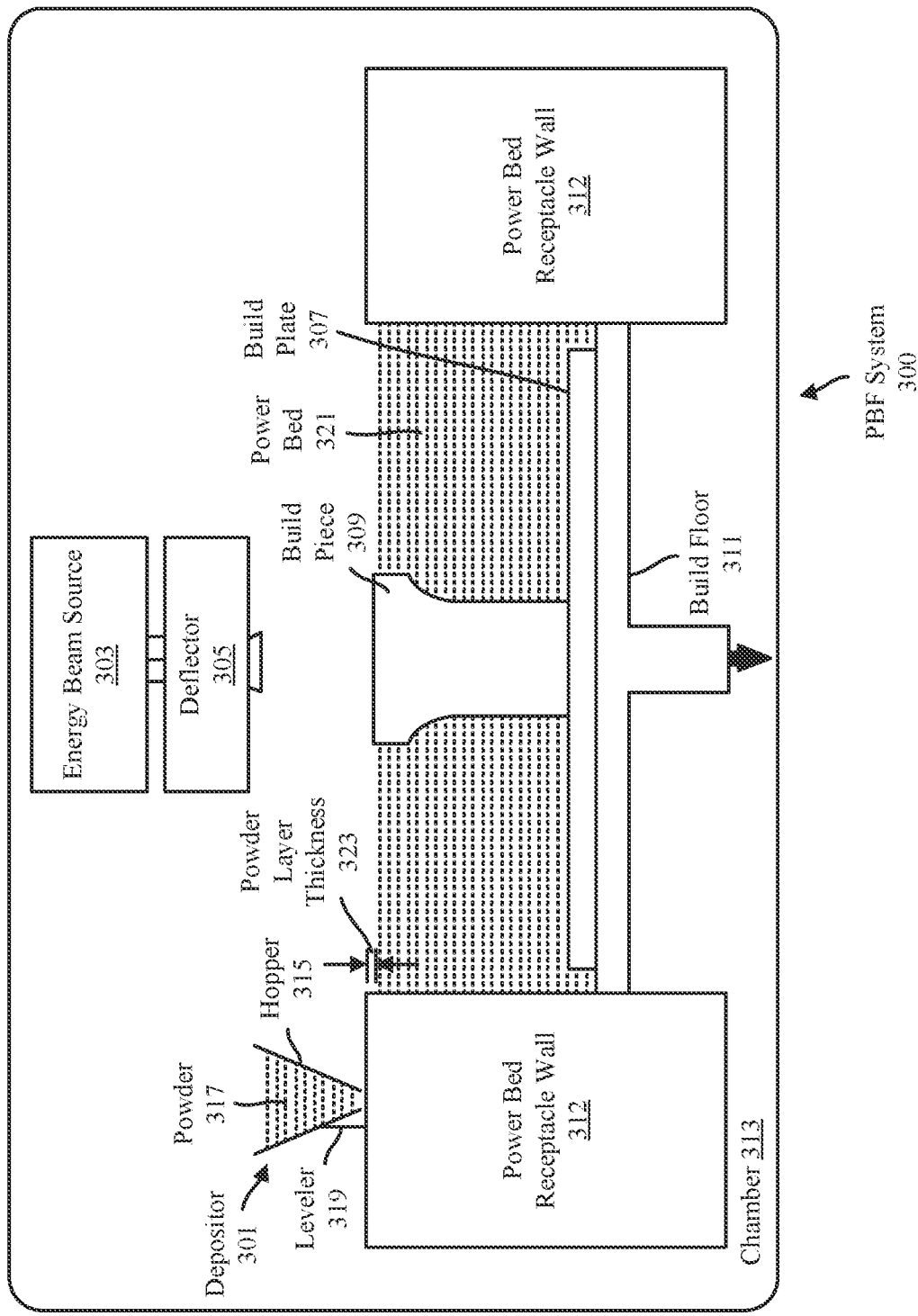

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
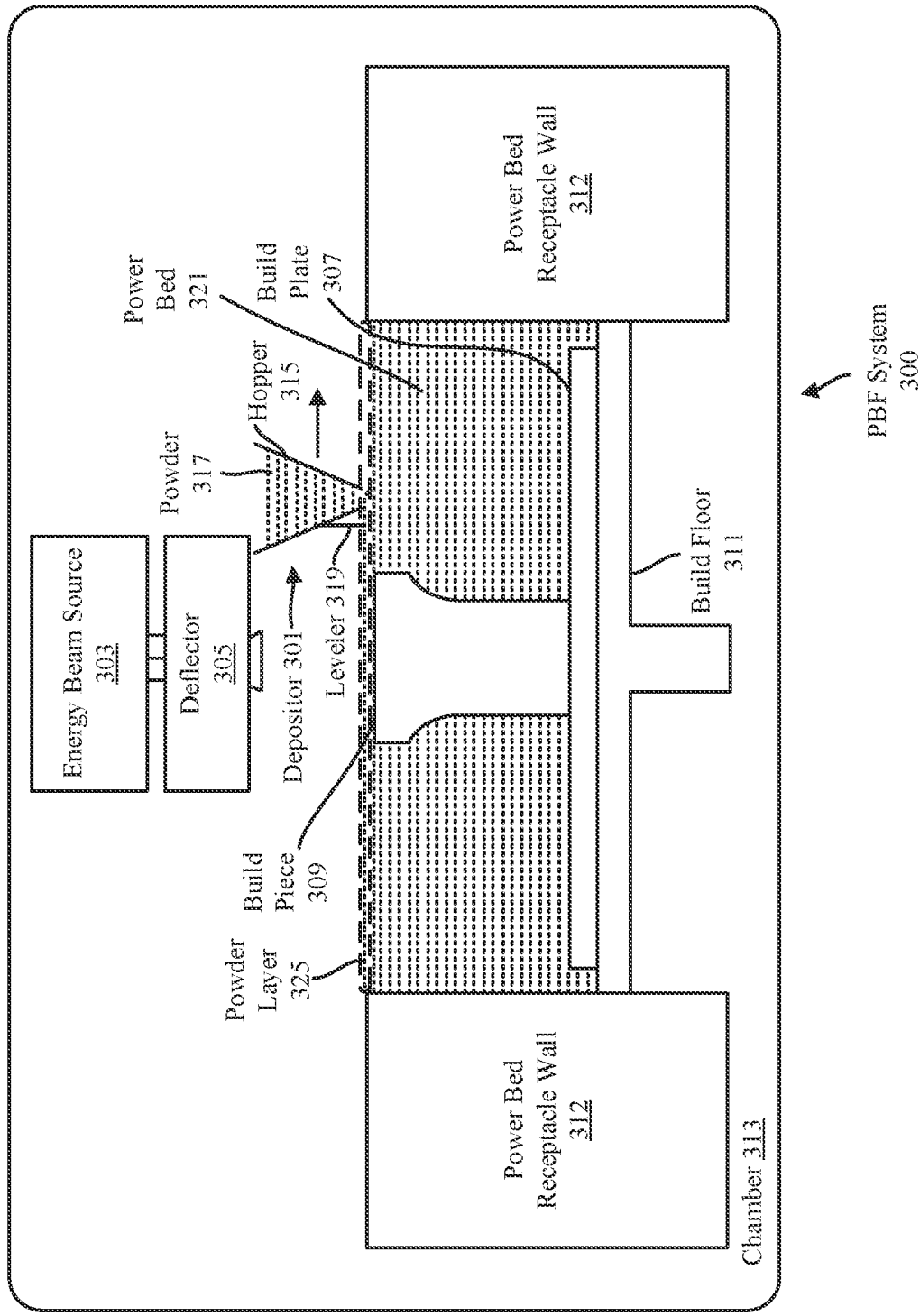

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
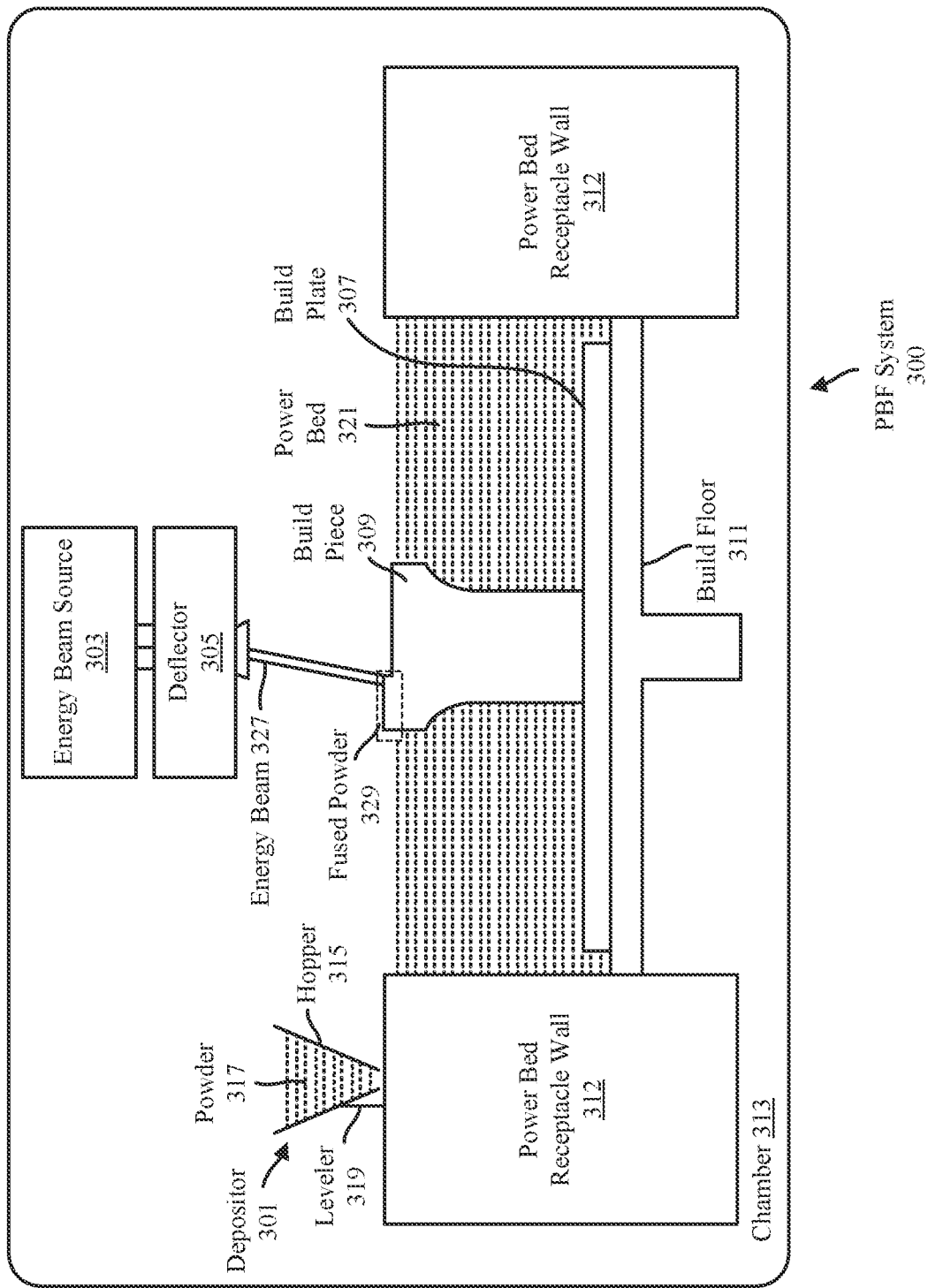

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Referring now to FIGS. 4-8, various techniques and solutions for creating metallic powders using ball milling apparatuses and methods are described. Ball milling techniques and solutions of the present disclosure utilize solid media (e.g., "balls") to refine particle sizes to achieve near-spherical metallic powder within a defined size range, such as a diameter range inclusively between 10 micrometers (μm) to 100 μm. The distribution of metallic powders (e.g., diameter, approximately spherical surface shape, etc.) may be controlled to be within one or more parameters that are relatively narrow and/or well-defined, thereby enabling reproducibility and quality assurance in creating metallic powders.

Furthermore, the various techniques and solutions for creating metallic powders using ball milling apparatuses and methods described in the present disclosure are advantageous over other approaches to creating metallic powders, such as gas atomization. For example, creating metallic powders using ball milling as described herein is more efficient than gas atomization because the embodiments described herein avoid melting metallic materials to create metallic powders, which simultaneously confers safety advantages to the ball milling described herein through the lower temperatures than those commensurate with gas atomization.

In addition, ball milling techniques and solutions of the present disclosure are more efficient than other approaches to creating metallic powders as less metallic material is irrevocably wasted during creation. Specifically, metallic materials may be re-alloyed using the ball milling apparatuses and methods described herein. For example, metallic powder that does not fall within the controlled distribution parameters and/or metallic powder recovered from cleaning/de-powdering operations may be reintroduced into a ball mill to be further fragmented or altered until satisfying the controlled distribution parameters.

Figure 4:
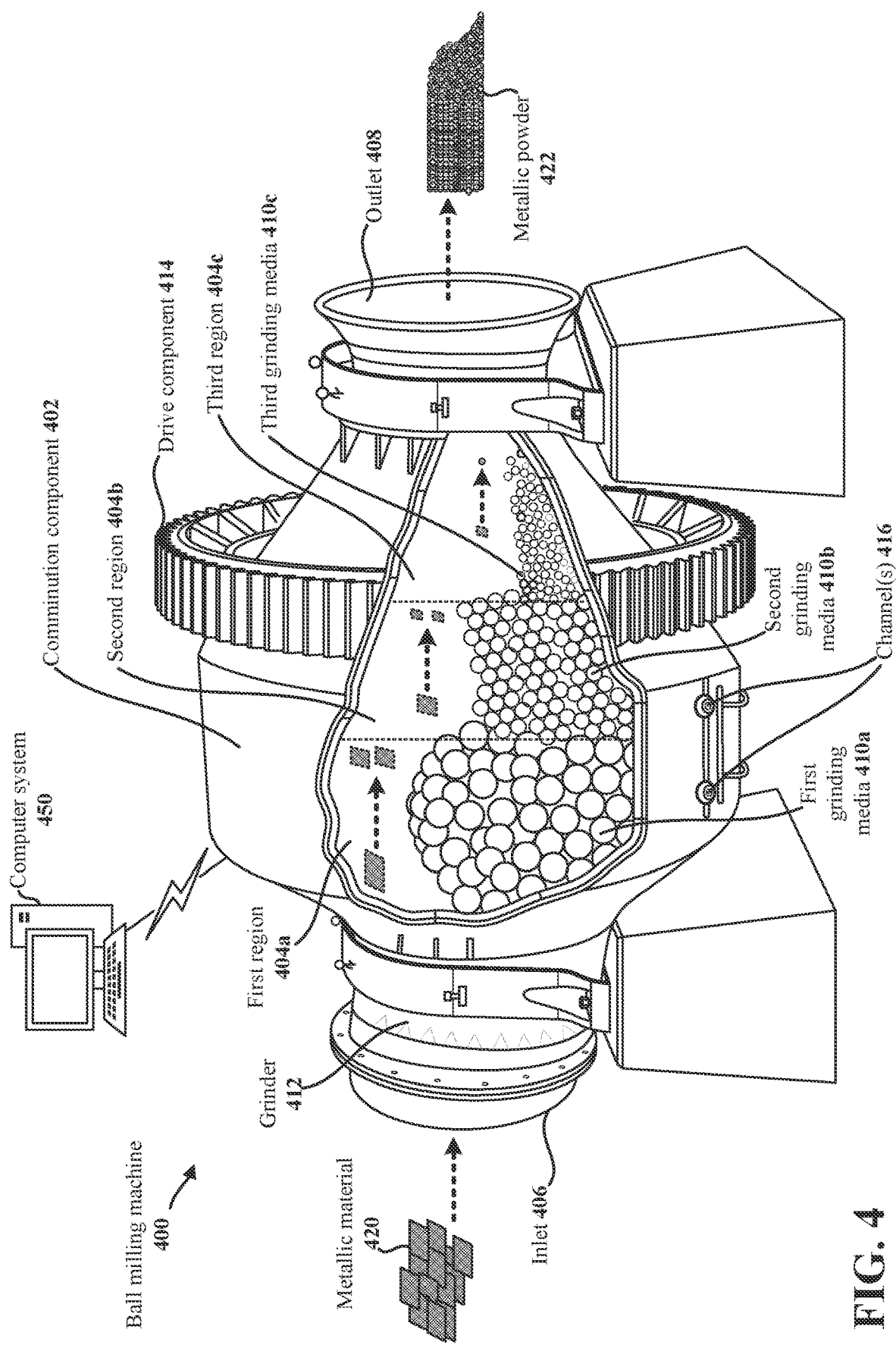
FIG. 4 illustrates a side perspective of a ball milling machine configured for continuous ball milling to create metallic powder, in accordance with some embodiments of the present disclosure.

FIG. 4 illustrates an example of a continuous ball milling machine 400, or simply "ball mill," in accordance with various embodiments of the present disclosure. In the illustrated embodiment, ball mill 400 includes a comminution component 402 having an inlet 406 and an outlet 408 disposed at opposing ends. While ball mill 400 is illustrated in a horizontal orientation, vertical orientations and/or other orientations, potentially with different arrangements/configurations of various components/parts (e.g., inlet 406, outlet 408, etc.), are also possible without departing from the scope of the present disclosure.

Ball mill 400 may be configured to receive some metallic material 420 at inlet 406. Metallic material 420 may be substantially composed of any metal suitable to be powdered and used in one or more of the AM or 3-D processes described herein, such as SLS, SLM, or other PBF-based process.

For example, metallic material 420 may be aluminum or an aluminum alloy, such as an aluminum alloy having less than twenty (20) percent (%) by weight of one or more of magnesium (Mg), manganese (Mn), silicon (Si), iron (Fe), titanium (Ti), zirconium (Zr), chromium (Cr), yttrium (Y), and/or copper (Cu) with a balance of aluminum. Potentially, however, metallic material 420 may be other metals or metal alloys, with or without aluminum. In some embodiments, metallic material 420 may be uniform throughout; although metallic material 420 may contain a mix of two or more metals/alloys, or metallic material 420 may be substantially uniform with trace amounts of one or more other metals/alloys included therein.

Metallic material 420 may be of any geometry (e.g., shape and/or dimension) that inlet 406 is capable of accommodating. For example, metallic material 420 may include machining chips, metal pellets, metal support material, parts from failed AM and 3-D printing processes, and so forth. Further, metallic material 420 may include metallic powder, such as metallic powder that is rejected for failing to satisfy quality assurance/quality control processes and/or metallic powder that is recovered during cleaning and/or de-powdering operations of/on ball mill 400. Such metallic powder may be recovered during operational cycles of ball mill 400 (e.g., while ball mill 400 is creating metallic powder) and/or between operational cycles of ball mill 400 (e.g., while ball mill 400 is being cleaned or de-powdered).

While some materials can be recycled or recovered for use with ball mill 400, recycled or recovered materials may need to be cleaned or altered to be in an acceptable feedstock state (e.g., alloy, chemical composition, morphology, grain state, etc.) for ball mill 400. For example, some AM processes may alter the chemical composition of metals or alloys used therein, such as through the loss of some volatile elements (e.g., Zr, Mg, etc.), and so the chemical composition of some metals or alloys may need to be altered (e.g., by adding one or more elements) to return the metals or alloys to a state suitable for use in future AM processes.

In some embodiments, ball mill 400 includes a grinder 412. Grinder 412 may be configured to receive metallic material 420 and grind metallic material 420 to a suitable size to be fed into a comminution component 402, where metallic powder is created via some media (e.g., "balls"). For example, grinder 412 may be configured to grind metal parts and/or structures of various sizes down to metallic chips or pellets suitable for ball milling.

To that end, ball mill 400 may include a filter, sieve, or other mechanism to separate metallic material having geometries unsuitable for ball milling from metallic material having geometries suitable for ball milling. Such a filter, sieve, or other mechanism may be configured to allow metallic material of suitable geometries (e.g., metallic chips or pellets) to pass through in comminution component 402, while preventing metallic material of unsuitable geometries from doing so. The metallic material of unsuitable geometries may be contained within grinder 412, which may continue to grind such metallic material until the suitable geometry is obtained (e.g., until the size/dimensions of metallic material is sufficiently reduced).

In some embodiments, the initial point of the ball milling process itself may begin as metallic material 420 is deposited in comminution component 402 through inlet 406, e.g., after being reduced in size/dimension by grinder 412. Comminution component 402 may have an interior that is a substantially hollow configured for the ball milling process to occur—e.g., the interior of comminution component 402 may be one or more mostly hollow chamber(s).

The interior of comminution component 402 may be of any dimension and/or geometry suitable for the ball milling processes described herein to occur. For example, the interior of comminution component 402 may be substantially smooth and cylindrical, and therefore, may be devoid of any sharp corners or angles, such as right angles. Additionally, a least a portion of the interior of comminution component 402 may be substantially conical. For example, comminution component 402 may taper toward outlet 408.

Metallic material 420 may be substantively transformed within comminution component 402 in order to create metallic powder 422; doing so, however, may involve at a minimum both refinement, or fragmentation, of the metallic material to obtain a suitable powder granule size and altering surface characteristics or morphology of the metallic material to obtain spherical, or nearly spherical, powder granules. The refinement, or fragmentation, of metallic material relies upon an impact force between grinding media and metallic material to be greater than a critical impact force at which the metallic material cracks, whereas propagating morphology changes (and so to ensphere or sphericalize) depends upon the impact force being less than that critical impact force. In addition, the impact frequency between grinding media and metallic material to propagate morphology changes is appreciably greater than the impact frequency to induce fragmentation.

In order to accommodate and facilitate such differences within one continuous ball mill, comminution component 402 may include two or more regions within. For example, as illustrated, comminution component 402 includes a first region 404a, a second region 404b, and a third region 404c. In some other embodiments, however, comminution component 402 may include more or fewer regions than the three illustrated. The regions within comminution component 402 may or may not be physically separated in any of one or more ways, as further described below.

Each of the regions within comminution component 402 may have respective impact components or grinding media arranged therein. As shown in FIG. 4, first grinding media 410a is arranged within first region 404a, second grinding media 410b is arranged within second region 404b, and third grinding media 410c is arranged within third region 404c.

In some embodiments, each grinding media 410a-c may be a ball or substantially spherical object. In some other embodiments, at least one of grinding media 410a-c may be configured with a different shape. The size (e.g., diameter) and weight of each grinding media 410a-c may be substantially uniform within a respective one of regions 404a-c. Further, the size and/or weight of each grinding media 410a-c respectively arranged in each region 404a-c may progressively decrease from the region closest to inlet 406 (and furthest from outlet 408) to the region closest to outlet 408 (and furthest from inlet 406). For example, first grinding media 410a may each have a diameter of approximately forty (40) millimeters (mm), second grinding media 410b may each have a diameter of approximately twenty (20) mm, and third grinding media 410c may each have a diameter of approximately one (1) mm.

Each grinding media 410a-c may be made of metal or metal alloy, which may be uniform within each grinding media 410a-c. Across the different regions, the respective metal or metal alloy of each grinding media 410a-c may be the same or may be different between some or all of grinding media 410a-c. In other words, first grinding media 410a may all be composed of a first metal or metal alloy, second grinding media 410b may all be composed of a second metal or metal alloy, and third grinding media 410c may all be composed of a third metal or metal alloy; however, the first, second, and/or third metals or metal alloys may be the same or may be different. For example, first grinding media 410a may be composed of a metal or metal alloy having a greater strength and/or hardness than third grinding media 410c.

In relation to metallic material 420, the respective metal or metal alloy of each grinding media 410a-c may have a greater strength (e.g., yield strength, compressive strength, etc.) and/or hardness than metallic material 420. In some embodiments, each grinding media 410a-c may be composed of steel or other iron-carbon alloy. In some other embodiments, first grinding media 410a may have a weight approximately sixty (60) times the weight of a granule of metallic powder 422, second grinding media 410b may have a weight approximately thirty (30) times the weight of a granule of metallic powder 422, and third grinding media 410c may have a weight approximately equal to the weight of a granule of metallic powder 422.

According to various embodiments, the regions of comminution component 402 may be considered as separate based on the difference(s) between one or more of the following parameters, which may be controlled to refine the size and/or morphology of metallic material before reaching outlet 408 as metallic powder 422: the ratio of the weight of grinding media to the weight of metallic powder (e.g., inclusively ranging from 60:1 to 1:1), the size of grinding media (e.g., inclusively ranging from 40 mm to 1 mm), the material(s) of grinding media, the temperature (e.g., inclusively ranging from −200 degrees Celsius (° C.) or temperature of liquid nitrogen to +200° C.), additives (e.g., surfactants, lubricants, abrasives, etc.), aspect ratio(s) of drive shaft(s) of ball mill 400, and/or surface texture(s) of drive shaft(s) of ball mill 400.

One or more parameters used to refine the size and/or morphology of metallic material may be controlled via one or more processes regulated by a computer system 450, which may be connected with ball mill 400 via at least one wired and/or wireless communications link. Computer system 450 may be configured to automatically execute some processes.

In some configurations, computer system 450 may detect various conditions within comminution component 402, and specifically within regions 404a-c, and computer system 450 may tune one or more parameters based on the detected various conditions (e.g., as with a closed-loop feedback system). For example, computer system 450 may detect the size/dimensions and/or morphology of metallic material 420 in one region, and adjust one or more parameters in the next region (e.g., temperature, additive(s), rotation speed(s), vibration movement(s), vibration intensity, etc.) based on the detected size/dimensions and/or morphology. In some other configurations, computer system 450 may adjust one or more parameters independent of the various conditions within comminution component 402.

Using temperature as one illustration, the temperature within comminution component 402 may be controlled to reach some minimum temperature at or near the middle region(s) of comminution component 402 (e.g., second region 404b). In so doing, the critical point (e.g., minimum impact force) to further fragment already-fragmented metallic material 420 may be reduced, and cold welding may be avoided. The temperature may then warm again at region(s) relatively more proximate to outlet 408 to increase the critical point to fragment metallic material 420, and facilitate morphology alteration.

Referring to additives, one or more additives may be added at specific region(s). The one or more additives may be configured to prevent cold welding of metallic material 420, prevent coagulation of metallic material 420, prevent chemical hardening of metallic material 420, lubricate metallic material 420, alter impact force between grinding media 410a-c and metallic material 420, alter impact frequency between grinding media 410a-c and metallic material 420, increase energy transfer between grinding media 410a-c and metallic material 420, and/or alter the amount of shear force between grinding media 410a-c and metallic material 420.

One or more other additives may be added at specific region(s) (e.g., relatively proximate to outlet 408) to alter the final properties of metallic powder 422 created through ball mill 400, such as flowability of metallic powder 422. Some additive(s) may be introduced to create well-mixed, bulk finalized chemical composition of metallic powder 422, which may be effectively re-alloyed in a later AM process. For example, specific elements or compounds may be added to recondition or re-alloy the metallic powder 422, e.g., so that the metallic powder 422 includes some properties desirable for AM processes, such as alloy, chemical composition, morphology, and/or grain state.

As described herein, ball mill 400 may be designed for milling through different regions at which the respective impact frequencies and impact forces are controlled to cause continuous fragmentation, disaggregation, and morphology alteration of metallic material 420 in order to create metallic powder 422. In some embodiments, such continuous milling is at least partially achieved through differently sized grinding media 410a-c at different regions 404a-c (e.g., regions 404a-c may correspond to different travel lengths of metallic material 420 or different travel heights of metallic material for a vertically oriented ball mill).

Accordingly, ball mill 400 may be configured to cause impacts between metallic material 420 and respective grinding media 410a-c as metallic material 420 travels between different regions 404a-c of comminution component 402. Movement of metallic material 420 and grinding media 410a-c may be induced by a drive component 414. Specifically, drive component 414 may be a part of or may be connected to comminution component 402, and drive component 414 may be configured to drive movement of comminution component 402, thereby causing metallic material 420 and grinding media 410a-c within to move.

In some embodiments, drive component 414 may be a gear or similar cog, which may interact with another gear or cog, e.g., causing comminution component 402 to move according to movement of drive component 414. In some other embodiments, drive component 414 may be a shaft (e.g., drive shaft), e.g., similar to an axle, which comminution component 402 may rotate about. Drive component 414 may define an axis of rotation of comminution component 402. For example, comminution component 402 may rotate with or about drive component 414.

In still other embodiments, drive component 414 may cause comminution component 402 to translate, e.g., in addition to or as an alternative to rotation. For example, drive component 414 may cause comminution component 402 to vibrate. Such vibration may include rapid repetition of at least vertical and/or horizontal translation—e.g., drive component 414 may cause comminution component 402 to quickly travel up and down, forward and backward, and/or side to side within a defined travel distance(s).

Potentially, comminution component 402 may include or may be connected with two or more drive components, and at least one of regions 404a-c may be connected with a respective one of the two or more drive components. For example, at least two of regions 404a-c may be configured for independent movement, and one drive component may cause one of regions 404a-c to rotate at a different speed than another drive component causes another of regions 404a-c to rotate.

Comminution component 402 may receive metallic material 420 at first region 404a having first grinding media 410a arranged therein, and drive component 414 may induce movement of first grinding media 410a and metallic material 420. As first grinding media 410a and metallic material 420 mix with one another due to the induced movement, first grinding media 410a may impact metallic material 420. Such impacts in first region 404a may cause metallic material 420 to fragment, e.g., so that the size of metallic material 420 is reduced and the surface area is increased. In other words, the impact force and/or frequency of first grinding media 410a causing fragmentation of metallic material 420 may increase the number of "pieces" of the metallic material.

Therefore, first grinding media 410a may impact metallic material 420 with a minimum impact force and/or impact frequency that is sufficient to fragment metallic material 420. In other words, the minimum impact force and/or impact frequency may exceed a critical point (e.g., minimum impact force) at which metallic material 420 cracks when struck by first grinding media 410a.

Such a critical point may be modulated by controlling one or more parameters of first region 404a, e.g., in order to reduce the critical point, and therefore facilitate fragmentation of metallic material 420. Some parameters may include the weight, size (e.g., diameter), and/or material of first grinding media 410a. Some other parameters may include temperature, additives, an aspect ratio of drive component 414, and/or a surface texture of drive component 414 (e.g., a number and/or size of teeth of drive component 414).

In some embodiments, comminution component 402 may include one or more channel(s) 416 or injection point(s), e.g., from the exterior surface through the interior surface and opening into one of regions 404a-c. Such channel(s) 416 (or injections points) may allow various parameters to be controlled by providing mechanism(s) for introducing one or more external substances or elements directly into one or more regions 404a-c. Such external substances or elements may be manually added and/or may be added through some process(es) controlled/regulated by computer system 450.

Metallic material 420 may enter inlet 406 at or near a room temperature. That is, the temperature of ball mill 400 may be unmodulated at inlet 406. The unmodulated temperature may extend through grinder 412—e.g., grinder 412 may be at or near room temperature so that metallic material 420 is likewise at or near room temperature during grinding.

However, the temperature within first region 404a may be modulated. In so doing, the critical point of metallic material 420 (e.g., the minimum impact force applied to crack the metallic material) may be reduced. One or more types of cryogens and/or refrigerated air may be introduced (e.g., via channel(s) 416) in order to reduce the temperature within first region 404a, and therefore, reduce the temperature of metallic material 420. In some embodiments, first region 404a may cooled to a temperature of approximately 0° C.; however, the temperature within first region 404a may be different according to different embodiments.

Additionally or alternatively, one or more additives may be introduced into first region 404a. For example, the one or more additives may be include an abrasive, silica, stearic acid, graphene, and/or another additive. One or more additives introduced in first region 404a may alter impact force, impact frequency, amount of shear force, and/or properties of metallic material 420 for creation of metallic powder 422. For example, additive(s) may reduce the critical point of metallic material 420 (e.g., the minimum impact force applied to crack the metallic material) and/or may increase the impact force of first grinding media 410a against metallic material 420, thereby increasing the efficacy of first grinding media 410a in fragmenting metallic material 420.

According to some embodiments, the impact frequency between first grinding media 410a and metallic material 420 may be lower relative to the impact frequency of third grinding media 410c and metallic material 420 (having been reduced in size in at least first region 404a). However, the impact force between first grinding media 410a and metallic material 420 may be greater relative to the impact force of third grinding media 410c and metallic material 420. For example, drive component 414 (and potentially other drive component(s)) may differently induce movement in first region 404a and third region 404c to control the relative impact force and/or relative impact frequency.

From first region 404a, metallic material 420 travels to the next region within comminution component 402—that is, second region 404b. In the illustrated embodiment, the next region is one in which the size/dimensions of metallic material 420 is further reduced; in other embodiments, however, the next region may be a region in which surface characteristics of metallic material is altered, such as a region analogous to third region 404c or a region serving as a preparatory stage before third region 404c.

Metallic material 420 may travel from first region 404a to second region 404b based on the movement and/or orientation of comminution component 402. For example, comminution component 402 may be oriented with a (slightly) downward slope, with inlet 406 being relatively higher than outlet 408, or comminution component 402 may be oriented as according to a vertical configuration. Rotation and/or vibration of comminution component 402 (driven by drive component 414) may cause metallic material 420 to travel through regions 404a-c toward outlet 408. Further, the interior geometry of comminution component 402 may cause metallic material 420 to travel from one region to the next—e.g., a conical geometry of the interior of comminution component 402 may facilitate the forward path of metallic material 420 toward outlet 408.

Ball mill 400 may be configured to prevent metallic material 420 from exiting one region and entering the next region until an appropriate size, dimension, and/or morphology is obtained. At least one respective filter or sieve may be positioned between each of regions 404a-c within comminution component 402. For example, at least one first filter or sieve may be positioned within comminution component 402 between first region 404a and second region 404b, and at least one second filter or sieve may be positioned within comminution component 402 between second region 404b and third region 404c.

Once (sufficiently) fragmented in first region 404a, metallic material 420 travels to second region 404b. In second region 404b, drive component 414 induces movement of second grinding media 410b and metallic material 420 causing impact therebetween. Similar to impacts in first region 404a, impacts in second region 404b may cause metallic material 420 to fragment, e.g., so that the size of metallic material 420 is reduced and the surface area is increased. However, the critical point (e.g., minimum impact force) at which metallic material 420 cracks when struck may be different in second region 404b relative to the first due to the reduced size/dimensions of metallic material 420.

Thus, one or more parameters in second region 404b may be controlled differently from one or more parameters in first region 404a, e.g., in order to reduce the critical point of metallic material 420. In particular, parameters including weight, size (e.g., diameter), and/or material of second grinding media 410b may be different than first grinding media 410a. Further, one or more other parameters, such as temperature, additives, an aspect ratio of drive component 414 (or another drive component), and/or a surface texture of drive component 414 (e.g., or another drive component), may be controlled to be different than in first region 404a.

Potentially, the reduced size of metallic material 420 in second region 404b may cause the critical impact point to be increased. Therefore, the temperature in second region 404b may be reduced relative to first region 404a (as well as third region 404c). For example, the temperature of ball mill 400, including the temperature to which metallic material 420 is exposed, may be at its lowest in second region 404b. Comparatively, the temperature of ball mill 400 may be at its highest (warmest) in third region 404c, with the temperature in first region 404a being somewhere in between (e.g., approximately at or below 0° C.).

Illustratively, the temperature in second region 404b may be controlled to be approximately −200° C.; however, the temperature within second region 404b may be different according to different embodiments. The temperature in second region 404b may decrease the critical impact point of metallic material 420, while avoid cold welding (potentially with the aid of additive(s)).

One or more types of cryogens and/or refrigerated air may be introduced in order to reduce the temperature within second region 404b, and so reduce the temperature of metallic material 420. For example, dry ice and/or liquid nitrogen may be added into second region 404b, e.g., via channel(s) 416.

Additionally or alternatively, one or more additives may be introduced into second region 404b, e.g., via channel(s) 416. For example, the one or more additives may be include an abrasive, silica, stearic acid, graphene, and/or another additive. Such additive(s) introduced in second region 404b may alter impact force, impact frequency, amount of shear force, and/or properties of metallic material 420 for creation of metallic powder 422. For example, may reduce the critical point of metallic material 420 (e.g., the minimum impact force applied to crack the metallic material) and/or may increase the impact force of first grinding media 410a against metallic material 420. Additive(s) introduced into second region 404b may be the same or different from additive(s) introduced into first region 404a.

According to some embodiments, the impact frequency between first grinding media 410a and metallic material 420 may be lower relative to the impact frequency of third grinding media 410c and metallic material 420 (having been reduced in size in at least first region 404a). However, the impact force between first grinding media 410a and metallic material 420 may be greater relative to the impact force of third grinding media 410c and metallic material 420. For example, drive component 414 (and potentially other drive component(s)) may differently induce movement in first region 404a and third region 404c to control the relative impact force and/or relative impact frequency.

After metallic material 420 is sufficiently fragmented at one or more preceding regions, the fragmented metallic material may reach one or more regions in which the surface characteristics or morphology of the fragmented metallic material is altered in order to finally create metallic powder 422. For example, fragmented metallic material 420 may traverse the first and second regions to reach third region 404c at which surface characteristics of metallic material 420 is altered, e.g., to obtain (near-) spherical metallic powder 422.

Metallic material 420 may reach third region 404c based on the movement, orientation, and/or interior geometry of comminution component 402. For example, comminution component 402 may be oriented with a (slightly) downward slope, with inlet 406 being relatively higher than outlet 408, comminution component 402 may be oriented as according to a vertical configuration, and/or comminution component 402 may feature a conical interior geometry tapering toward outlet 408.

Similar to configurations described above with respect to the first and second regions, fragmented metallic material 420 may comingle with third grinding media 410c at third region 404c. As drive component 414 induces movement of third grinding media 410c and metallic material 420, third grinding media 410c impacts metallic material 420. Such impacts in first region 404a may alter surface characteristics or morphology of metallic material 420 without causing fragmentation thereof, e.g., so that the exterior surface of granules of metallic powder 422 become spherical or nearly spherical.

Therefore, third grinding media 410c may impact metallic material 420 with a maximum impact force and/or impact frequency that is insufficient to fragment metallic material 420, but sufficient to change the surface characteristics/morphology of fragmented metallic material 420. In other words, the maximum impact force and/or impact frequency of third grinding media 410c against fragmented metallic material 420 may be less than the critical point of the fragmented metallic material 420 (e.g., minimum impact force to cause metallic material 420 to again be fragmented in third region 404c).

In some embodiments, third region 404c may be a region of high energy, e.g., relative to the low-energy of first region 404a, such that the impact frequency between the grinding media and metallic material is increased in third region 404c but the impact force is decreased. In some other embodiments, however, different regions may be regarded as "low energy" and "high energy," and may be differently arranged in comminution component 402 to alloy and/or alter metallic material 420 as desired for the creation of metallic powder 422 (e.g., nano-grain refinement).

As with the other regions described above, one or more parameters within third region 404c may be controlled, although parameters in third region 404c may be controlled to prevent fragmentation of metallic material 420 (e.g., increase the critical point) while facilitating morphology changes to metallic material 420. Thus, various parameters may include the weight, size (e.g., diameter), and/or material of third grinding media 410c. Various other parameters may include temperature, additives, an aspect ratio of drive component 414, and/or a surface texture of drive component 414 (e.g., a number and/or size of teeth of drive component 414).

By way of illustration, the temperature within third region 404c may be increased, e.g., relative to room temperature. In so doing, the critical point of metallic material 420 (e.g., the minimum impact force applied to crack the metallic material) may be increased but the malleability of the surface of metallic material 420 may be increased. For example, heated air may be introduced (e.g., via channel(s) 416) in order to increase the temperature within third region 404c. In some embodiments, third region 404c may heated to a temperature of approximately +200° C.; however, the temperature within third region 404c may be different according to different embodiments.

Additionally or alternatively, one or more additives may be introduced into first region 404a. For example, the one or more additives may be include an surfactants, lubricants, silica, stearic acid, graphene, and/or another additive. One or more additives introduced in third region 404c may alter impact force, impact frequency, amount of shear force, and/or properties of metallic material 420 for creation of metallic powder 422. For example, additive(s) introduced in third region 404c may increase the critical point of metallic material 420 (e.g., the minimum impact force applied to crack the metallic material) and/or may increase malleability of metallic material 420, thereby increasing the efficacy of third grinding media 410c in altering the morphology of metallic material 420 to be (nearly) spherical.

When the surface characteristics/morphology of fragmented metallic material 420 is satisfactorily altered in the last region (e.g., third region 404c), the (nearly) spherical metallic material may create metallic powder 422. Ball mill 400 may output metallic powder 422 at outlet 408, e.g., into a receptacle or other suitable container for the finished metallic powder. For example, comminution component 402 may be oriented with a (slightly) downward slope, with outlet 408 being relatively lower than third region 404c, or comminution component 402 may be oriented as according to a vertical configuration.

Alternatively or additionally, rotation and/or vibration of comminution component 402 (driven by drive component 414) may cause metallic material 420 to travel toward outlet 408. Further, the interior geometry of comminution component 402 may cause metallic material 420 to travel toward outlet 408—e.g., a conical geometry of the interior of comminution component 402 may facilitate the forward path of metallic material 420 toward outlet 408.

The spherical metallic material may create metallic powder 422 once each granule is both sufficiently spherical and within a defined size (e.g., diameter) range. Thus, ball mill 400 may be configured to fragmented metallic material 420 from exiting outlet 408 until an appropriate size and morphology is obtained. For example, at least one filter or sieve may be positioned between third region 404c and outlet 408. The at least one filter or sieve may prevent metallic material 420 from exiting through outlet 408.

While ball mill 400 is illustrated with one outlet, some other embodiments of ball mill 400 may include two or more outlets and/or output through outlet 408 may be modulated at different point(s) during powder creation. That is, ball mill 400 may be configured to create metallic powders having different characteristics (e.g., different sizes/diameters and/or different morphologies), e.g., potentially during continuous operation of ball mill 400.

Thus, the characteristics of (or constraints on) the final powder may be modulated so that different powder is created and output through outlet 408 and/or additional outlet(s). For example, ball mill 400 may reconfigure the size/diameter of the final powder during the ball milling process, such as by reducing the size/diameter and/or altering the acceptable morphology of the final metallic powder after some metallic powder has already been created. To that end, ball mill 400 may reconfigure or replace one or more filters or sieves that metallic powder passes through to be dispenses through outlet 408, e.g., so that only granules relatively smaller and/or having different morphology than previously created metallic powder are able to travel through the one or more filters or sieves. Additionally or alternatively, ball mill 400 may reconfigure or switch to another outlet (e.g., different from outlet 408) so that only metallic powder of a smaller size/diameter and/or different morphology is permitted to pass through.

In some embodiments, at least one filter or sieve may be vibrated at a certain frequency (or respective frequencies for multiple filters or sieves), which may facilitate the ejection of metallic powder 422 adhering to the size range and morphology constraints for powder creation. Additionally or alternatively, at least one filter or sieve may spin or rotate, e.g., at an offset from at least one other filter or sieve, in order to control the flow of metallic material 420 in third region 404c and so allow only metallic powder 422 within the size range and morphology constraints to be ejected.

In some other embodiments, one or more sensors may be arranged within comminution component 402, such as visual, ultrasonic, and/or acoustic sensors. The one or more sensors may be connected with computer system 450, and therefore, may provide information about the metallic material within one or more of regions 404*a-c* in which the sensor(s) are positioned. Computer system 450 may use information from the sensor(s) to detect size and/or morphology of metallic material 420 in one or more of regions 404*a-c*, and computer system 450 may control the travel of metallic material 420 across the regions based on the detected size and/or morphology.

For example, a set of sensors may be located proximate to outlet 408, and may be configured to sense information about the fragmented metallic material in third region 404*c*. Computer system 450 may receive the information from the set of sensors and, based on the information, may determine whether metallic powder 422 is created—that is, computer system 450 may determine whether metallic material 420 is fragmented to a size and altered to a spherical morphology that is acceptable as metallic powder 422. When computer system 450 determines metallic material 420 is fragmented to a size and altered to a spherical morphology that is acceptable as metallic powder 422, computer system 450 may cause metallic powder 422 to be dispensed through outlet 408, such as by opening a barrier. Otherwise, computer system 450 may retain metallic material 420 with comminution component 402 until the metallic material is fragmented to a size and altered to a spherical morphology that is acceptable as metallic powder 422.

In some aspects, the properties or characteristics of the metallic powder 422 may be configurable. For example, computer system 450 may receiver user input indicating some size/dimension range and/or morphology, and computer system 450 may configure one or more parameters of ball mill 400 so that ball mill 400 creates metallic powder conforming to the size/dimension range and/or morphology. Potentially, such user input may include the type of AM process (e.g., SLS, SLM, or other PBF-based process) and/or type of build of an AM process (e.g., node, structure, load-bearing part, etc.) for which the metallic powder is being created, and computer system 450 may configure ball mill 400 based on the user input including the type of AM process and/or type of AM process build.

In some further embodiments, ball mill 400 may be configured to be cleaned through the addition of additives and/or cleaning agents at inlet 406 (e.g., rather than metallic material 420). That is, ball mill 400 may be "self-cleaning" by executing the ball milling process, but with some cleaning additive(s) and/or cleaning agent(s) instead of metallic material 420 to create metallic powder 422. In some other further embodiments, ball mill 400 may be at least partially cleaned using pressurized liquid and/or gas, and/or introducing liquid nitrogen or other additive, through one or more of inlet 406, outlet 408, channel(s) 416, media entrance/exit point(s), and/or other paths to access the interior of comminution component 402.

Figure 5:
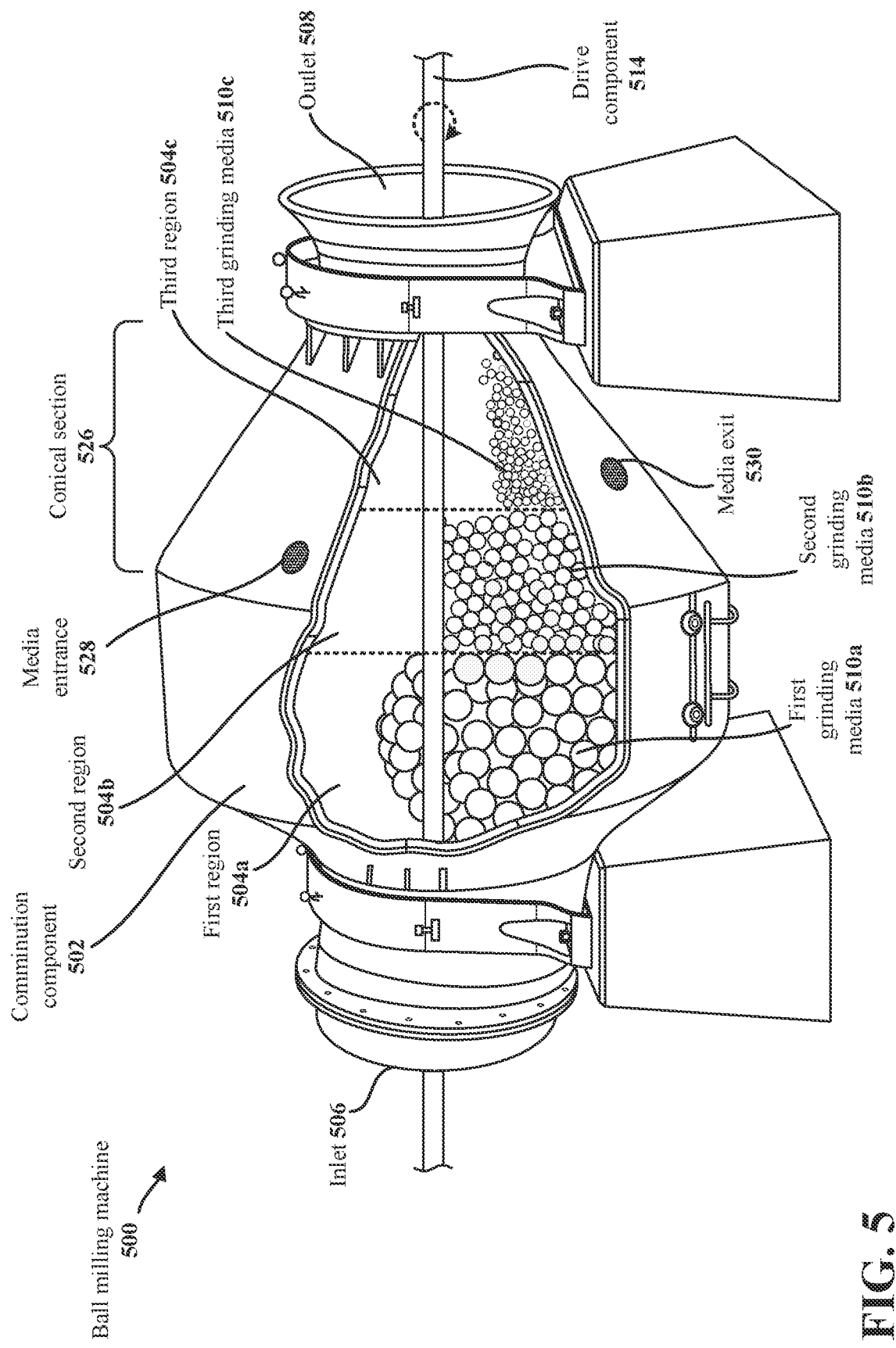
FIG. 5 illustrates a side perspective of a ball milling machine configured for continuous ball milling to create metallic powder, in accordance with some other embodiments of the present disclosure.

FIG. 5 illustrates another example of a continuous ball milling machine 500, or "ball mill," in accordance with various embodiments of the present disclosure. Ball mill 500 may be an implementation of ball mill 400, and therefore, may likewise include a comminution component 502 separated into multiple regions, e.g., a first region 504*a*, a second region 504*b*, and a third region 504*c*, and having an inlet 506 and an outlet 508 oppositely arranged thereon.

According to various embodiments, comminution component 502 may include a conical section 526, which is relatively widest at the point most proximate to inlet 506 and relatively narrowest at the point most proximate to outlet 508. While ball mill 500 is illustrated with conical section 526 spanning only a portion of the entire comminution component 502, in other embodiments, most or all of comminution component 502 may be defined as conical section 526.

In still other embodiments, comminution component 502 may include a second conical section, which may be substantially inverse to conical section 526. In such other embodiments, the narrowest area of comminution component 502 may be relatively near the middle, where the narrowest section of conical section 526 meets the second conical section. Therefore, the widest areas of conical section 526 and the second conical section may be near inlet 506 and outlet 508, respectively.

Within comminution component 502, each of a first grinding media 510*a*, a second grinding media 510*b*, and a third grinding media 510*c* may be respectively arranged in first, second, and third regions 504*a-c*. Ball mill 500 may be configured to maintain such an arrangement of grinding media, e.g., to prevent or reduce the likelihood of one of grinding media 510*a-c* from becoming comingled with another one of grinding media 510*a-c*.

In some configurations, the interior geometry of comminution component 502 may facilitate the prevention of grinding media 510*a-c* becoming comingled. For example, the interior geometry of comminution component 502 may be configured to reduce or prevent one grinding media arranged within one region from traveling to another region (and mixing with another grinding media of the other region). However, such an interior geometry may still allow the free flow of metallic material therein, e.g., between regions as appropriate.

In some other configurations, which may include vertical or relatively more vertical orientations of ball mill 500, grinding media 510*a-c* may be quasi-stacked within respective regions 504*a-c*, and substantially horizontal movement of comminution component 502 may minimize mixing of grinding media 510*a-c* (e.g., vertical mixing). For example, comminution component 502 may include one or more points of media exit 530. Ball mill 500 may be configured to release one of grinding media 510*a-c* that is mixed with another of grinding media 510*a-c* through media exit 530.

One of grinding media 510*a-c* that is released through media exit 530 may be resorted and then added back into the corresponding one of regions 504*a-c*, e.g., through a point of media entrance 528. In some embodiments, resorting and returning one of the grinding media to its corresponding region may be automatically executed. Although in other embodiments, resorting and returning one of the grinding media to its corresponding region may be manually performed.

In some embodiments, one or more of grinding media 510*a-c* may be coated. For example, first grinding media 510*a* may be coated with a substance that increases the likelihood of fragmenting metallic material upon impact. Conversely, third grinding media 510*c* may be coated with a substance that decreases the likelihood of fragmenting metallic material upon impact, which may increase the alteration of surface characteristics of metallic material caused upon impact with third grinding media 510*c*. Illustratively, substances that may be used to coat at least one of grinding media 510*a-c* may prevent cold welding of metallic material, prevent coagulation of metallic material, prevent chemical hardening of metallic material, lubricate metallic material, alter impact force of at least one grinding media 510*a-c*, alter impact frequency of at least one grinding media 510a-c, increase energy transfer to or from at least one grinding media 510a-c, and/or alter shear force of at least one grinding media 510a-c.

As coating on the grinding media may chip or otherwise wear off over time, the coating may be redone. For example, grinding media may be recoated between cycles of metallic powder creation. Additionally or alternatively, grinding media may be recoated when removed through media exit 530 and added through media entrance 528, e.g., during cycles of metallic powder creation).

According to various embodiments, ball mill 500 may include a drive component 514 that is different from a gear or cog, such as a gear encircling comminution component 502. For example, drive component 514 may include at least one drive shaft. Potentially, drive component 514 may be connected with or fabricated (e.g., machined) as part of comminution component 502, and may be positioned through at least a portion of the interior of comminution component 502.

Drive component 514 may be configured to rotate (e.g., drive component 514 may be connected with a motor or other engine), which may drive movement of comminution component 502, as well as the components (e.g., grinding media 510a-c, metallic material, etc.) arranged therein. Drive component 514 may define an axis of rotation of comminution component 502.

In some embodiments, the speed and/or force with which drive component 514 causes comminution component 502 to move (rotate) may be based on one of regions 504a-c. For example, drive component 514 may be configured to cause comminution component 502 to rotate at a relatively lower rate when metallic material is arranged within first region 504a, but drive component 514 may be configured to cause comminution component 502 to rotate at a relatively faster rate when metallic material is arranged within third region 504c.

An aspect ratio of drive component 514 may affect movement of comminution component 502, as well as movement of grinding media 510a-c and metallic material therein. The aspect ratio of drive of drive component 514 may be modulated, which may change the impact force and/or impact frequency of grinding media 510a-c and metallic material.

In some other embodiments, drive component 514 may include two or more drive shafts. For example, drive component 514 may include a respective drive shaft for each of regions 504a-c within comminution component 502. The aspect ratios of each of the drive shafts may be configured according to the impact force and/or impact frequency that is desirable for each of regions 504a-c.

Potentially, two or more of regions 504a-c may be configured to move (rotate) independently. For example, drive component 514 may include three drive shafts for the three regions within comminution component 502. Each drive shaft may cause a respective one of regions 504a-c to rotate independently at a respective rate that is configured for the impact force and/or frequency desirable for that region.

In some embodiments, drive component 514 may be coated—e.g., one or more drive shafts of drive component 514 may be individually coated with the same or different substance or additive. For example, in first region 504a, drive component 514 may be coated with a substance that increases the likelihood of fragmenting metallic material upon impact. In third region 504c, however, drive component 514 may be coated with a substance that decreases the likelihood of fragmenting metallic material upon impact, which may increase the alteration of surface characteristics of metallic material. Illustratively, substances that may be used to coat drive component 514 may prevent cold welding of metallic material, prevent coagulation of metallic material, prevent chemical hardening of metallic material, lubricate metallic material, alter impact force, alter impact frequency, increase energy transfer, and/or alter an amount of shear force.

The ball milling process may cause some coating(s) on drive component 514 to wear or "chip off" over time. Therefore, coating(s) on drive component 514 may be reapplied, e.g., between cycles of powder creation. Additionally or alternatively, coating(s) on drive component 514 may be changed, e.g., according to desired characteristics of the final powder, the type of metallic material being milled, and so forth.

Figure 6:
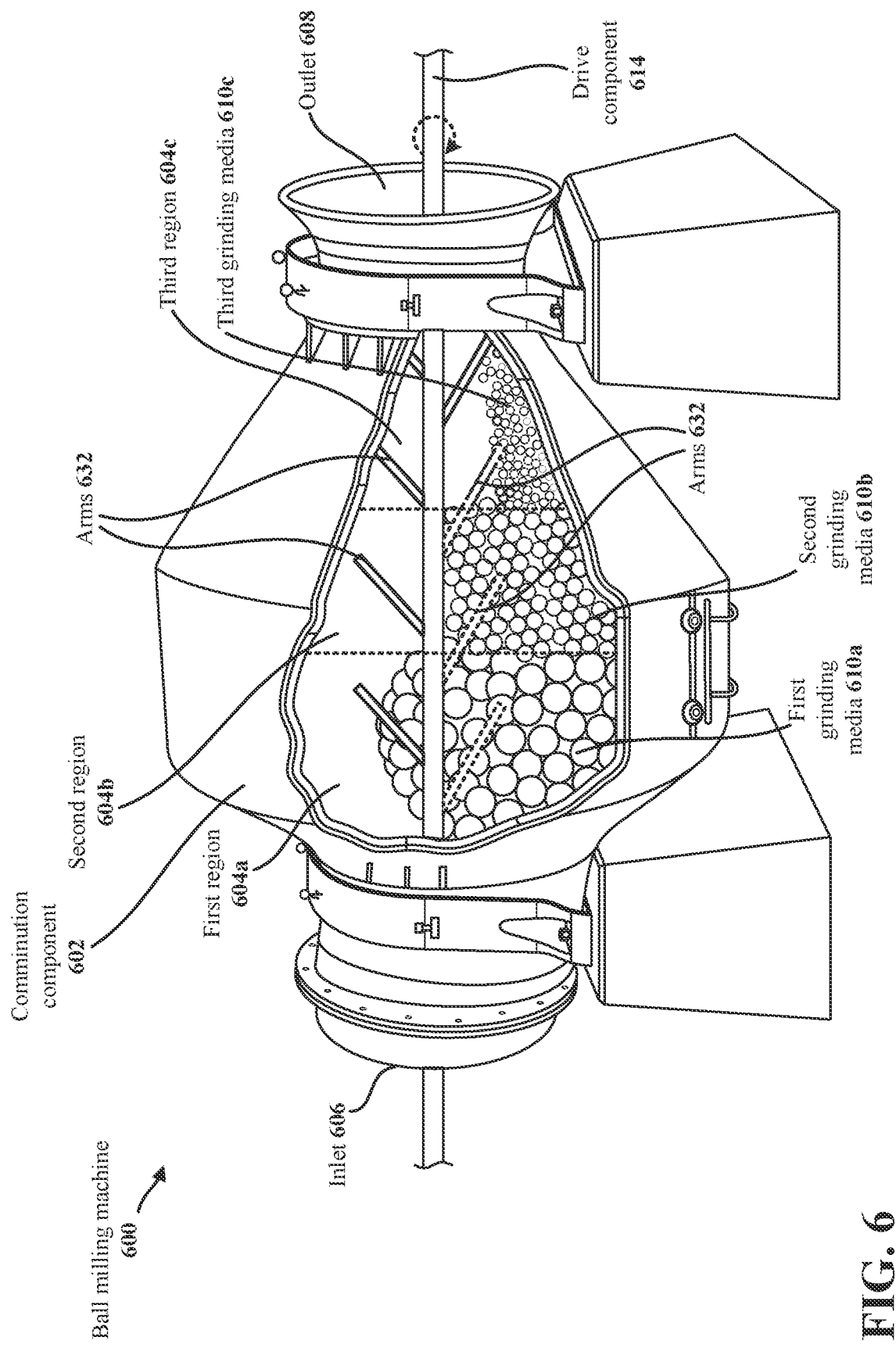
FIG. 6 illustrates a side perspective of a ball milling machine configured for continuous ball milling to create metallic powder, in accordance with some further embodiments of the present disclosure.

FIG. 6 illustrates another example of a continuous ball milling machine 600, or "ball mill," in accordance with various embodiments of the present disclosure. Ball mill 600 may be an implementation of ball mill 400 and/or ball mill 500, and therefore, may likewise include a comminution component 602 separated into multiple regions, e.g., a first region 604a, a second region 604b, and a third region 604c, and having an inlet 606 and an outlet 608 oppositely arranged thereon.

According to various embodiments, ball mill 600 includes a drive component 614 that may be at least one drive shaft. For example, drive component 614 may define an axis of rotation of comminution component 602. Potentially, drive component 614 may include two or more drive shafts—e.g., drive component 614 may include three drive shafts, each of which may be configured to drive movement of/in at least one of regions 604a-c within comminution component 602.

When drive component 614 is configured to include two or more drive shafts, some or all of the two or more drive shafts may have some different characteristics. For example, the two of more drive shafts may have different aspect ratios—e.g., one drive shaft configured for first region 604a may have a different aspect ratio than another drive shaft configured for third region 604c. In some other examples, the two or more drive shafts may have different dimensions (e.g., lengths, widths, heights, diameters, etc.) and/or different shapes.

In various embodiments illustrated in FIG. 6, a set of arms 632 is arranged within comminution component 602. For example, arms 632 may extend at an angle (e.g., approximately 45°) along the direction of travel of metallic material within comminution component 602 during the milling process. In some embodiments, arms 632 may be configured to extend from drive component 614. In some other embodiments, some or all of arms 632 may extend from another surface within comminution component 602. For example, some or all of arms 632 may extend from the interior surface of comminution component 602.

Each of regions 604a-c may have at least one of arms 632 substantially positioned therein. For example, each of one or more drive shafts may have at least one of arms 632 extending therefrom, e.g., such that each of regions 604a-c may have at least one of arms 632 substantially positioned therein. However, the number of arms 632 substantially positioned within each of regions 604a-c may be different.

Arms 632 may be of length(s) that allows movement within comminution component 602. In particular, arms 632 may be of length(s) that allow drive component 614 to rotate 360° (and so cause arms to rotate the same 360°) without contacting the interior surface of comminution component 602. Thus, when the interior geometry of comminution component 602 is cylindrical, arms 632 may be of length(s) that is less than half the radius of comminution component 602.

In some embodiments, arms 632 may each be of one uniform length. In some other embodiments, some or all of arms 632 may have different lengths. For example, the arms substantially positioned in first region 604*a* may have a greater length than the arms substantially positioned in third region 604*c*, which may have a relatively smaller volume than first region 604*a* due to the conical shape of comminution component 602.

Arms 632 may be of any suitable shape(s), which may be uniform for all of arms 632 or may be different for some or all of arms 632. For example, some or all of arms 632 may be substantially cylindrical. Additionally or alternatively, some or all of arms 632 may have a blade shape and/or a triangular shape. Further, some or all of arms 632 may taper down the point of connection (e.g., to drive component 614 or the interior of comminution component 602), so that those arms are wider toward their distal ends.

Arms 632 may have any suitable surface texture(s), which may be uniform for all of arms 632 or may be different for some or all of arms 632. For example, some or all of arms 632 may have some surface texture designed to increase friction or reduce friction.

Within comminution component 602, each of a first grinding media 610*a*, a second grinding media 610*b*, and a third grinding media 610*c* may be respectively arranged in first, second, and third regions 604*a-c*. Ball mill 600 may be configured to maintain such an arrangement of grinding media, e.g., to prevent or reduce the likelihood of one of grinding media 610*a-c* from becoming comingled with another one of grinding media 610*a-c*.

In some configurations, arms 632 may facilitate the prevention of grinding media 610*a-c* becoming comingled. For example, arms 632 may be configured to reduce or prevent one grinding media arranged within one region from traveling to another region (and mixing with another grinding media of the other region). Further, arms 632 may still allow, or may aid, the free flow of metallic material, e.g., between regions 604*a-c* as appropriate.

Potentially arms 632 may maintain segregation of grinding media 610*a-c* from one another based on the frequency of impact with arms 632. For example, different sets of arms 632 may configured to rotate at different rates, which may control the frequency with which arms 632 contact grinding media 610*a-c*. Each of grinding media 610*a-c* may contact a respective set of arms 632 with a respective frequency that maintains segregation between grinding media 610*a-c*.

In some embodiments, ball mill 600 may be vertically oriented, and the frequency with which each set of arms contacts respective grinding media 610*a-c* may maintain such segregation by keeping respective grinding media 610*a-c* aloft within its own corresponding one of regions 604*a-c*. To that end, each set of arms 632 positioned within each of regions 604*a-c* may be configured with a respective speed, amount, and/or geometry corresponding to maintaining respective grinding media within its own region.

In addition, or as an alternative, to maintain segregation of grinding media 610*a-c*, arms 632 may be configured to affect the impact force and/or impact frequency of grinding media 610*a-c* against metallic material within regions 604*a-c*. For example, the number, size, surface texture, and/or rotation speed of some of arms 632 may be controlled to increase impact force and decrease impact frequency in region(s) in which metallic material is to be fragmented (e.g., first region 604*a*), whereas the number, size, surface texture, and/or rotation speed of some other of arms 632 may be controlled to decrease impact force and increase impact frequency in region(s) in which surface characteristics of metallic material is to be altered (e.g., third region 604*c*).

In some embodiments, some or all of arms 632 may be coated—e.g., some or all of arms 632 may be coated with the same or different substance or additive. For example, in first region 604*a*, one set of arms 632 may be coated with a substance that increases the likelihood of fragmenting metallic material upon impact. In third region 604*c*, however, another set of arms 632 may be coated with a substance that decreases the likelihood of fragmenting metallic material upon impact, which may increase the alteration of surface characteristics of metallic material. Illustratively, substances that may be used to coat some or all of arms 632 may prevent cold welding of metallic material, prevent coagulation of metallic material, prevent chemical hardening of metallic material, lubricate metallic material, alter impact force, alter impact frequency, increase energy transfer, and/or alter an amount of shear force.

Figure 7:
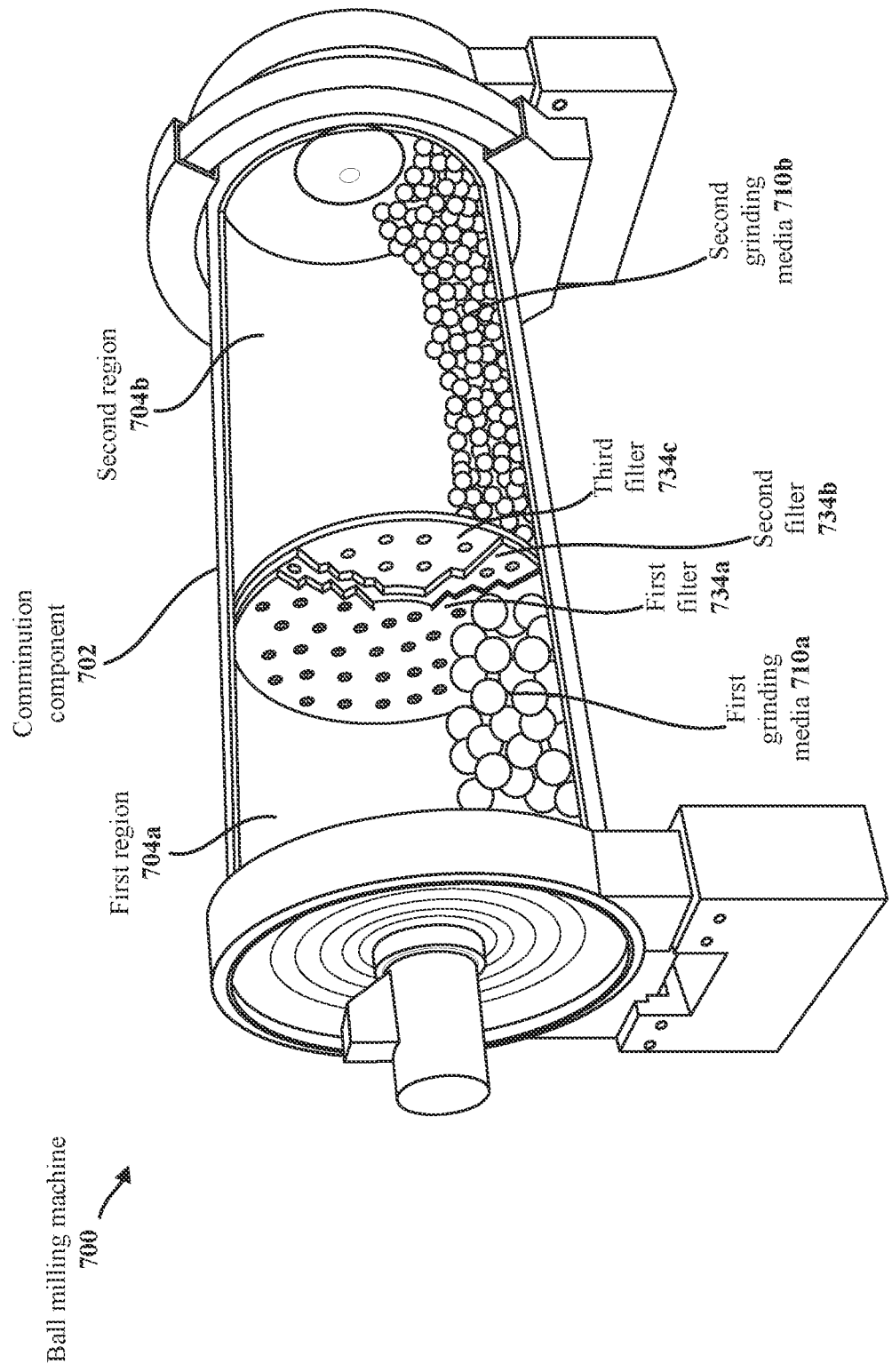
FIG. 7 illustrates a perspective of a ball milling machine configured for continuous ball milling to create metallic powder, in accordance with still other embodiments of the present disclosure.

FIG. 7 illustrates another example of a continuous ball milling machine 700, or "ball mill," in accordance with various embodiments of the present disclosure. Ball mill 700 may be an implementation of ball mill 400, ball mill 500, and/or ball mill 600, and therefore, may likewise include a comminution component 702. In some embodiments, comminution component 702 may include a first region 704*a* and a second region 704*b*.

In some embodiments, regions 704*a-b* within comminution component 702 may be separated by a set of one or more filters 734*a-c*. Potentially, one or more of filters 734*a-c* may implemented as a sieve. Although three filters are illustrated in FIG. 7, more or fewer filters may be used in other embodiments and/or to separate other regions (e.g., second and third regions).

Each of filters 734*a-c* may include a set of holes or throughways. Potentially, filters 734*a-c* may all include the same number of holes or throughways; however, some or all of filters 734*a-c* may include different numbers of holes or throughways. The holes or throughways of filters 734*a-c* may be aligned and/or may be offset.

Each of the holes or throughways may be of a size/dimension and/or morphology configured to allow satisfactorily fragmented/altered metallic material to pass through from first region 704*a* to second region 704*b*, while preventing unsuitable metallic material from passing through (e.g., metallic material that is too large or too misshapen to be accommodated at second region 704). Furthermore, ball mill 700 may be configured to prevent metallic material 720 within one region from traveling backward to a previously traversed region.

According to some embodiments, filters 734*a-c* may be configured to vibrate in order to control the flow of metallic material progressively toward second region 704*b*. Filters 734*a-c* may vibrate at one uniform frequency, or some or all of filters 734*a-c* may vibrate at different frequencies. According to some other embodiments, filters 734*a-c* may rotate or spin at one uniform rate, or some or all of filters 734*a-c* may rotate or spin at different rates. Potentially, one or more of filters 734*a-c* may be connected to the interior of comminution component 702, and therefore, the one or more filters may rotate or vibrate according to rotation/movement of comminution component 702 (e.g., as induced by a drive component).

Within comminution component 702, a first grinding media 710*a* and a second grinding media 710*b* may be respectively arranged in regions 704*a-b*. Ball mill 700 may be configured to maintain such an arrangement of grinding media, e.g., to prevent or reduce the likelihood of one of grinding media 710a-b from becoming comingled with another one of grinding media 710a-b.

In some configurations, filters 734a-c may facilitate the prevention of grinding media 710a-b becoming comingled. For example, filters 734a-c may be configured to reduce or prevent first grinding media 410a arranged within first region 404a from traveling to second region 404b, and vice versa. Specifically, the holes of throughways of filters 734a-c may obstruct grinding media 710a-b, and so prevent grinding media 710a-b from migrating out of its corresponding region.

Figure 8:
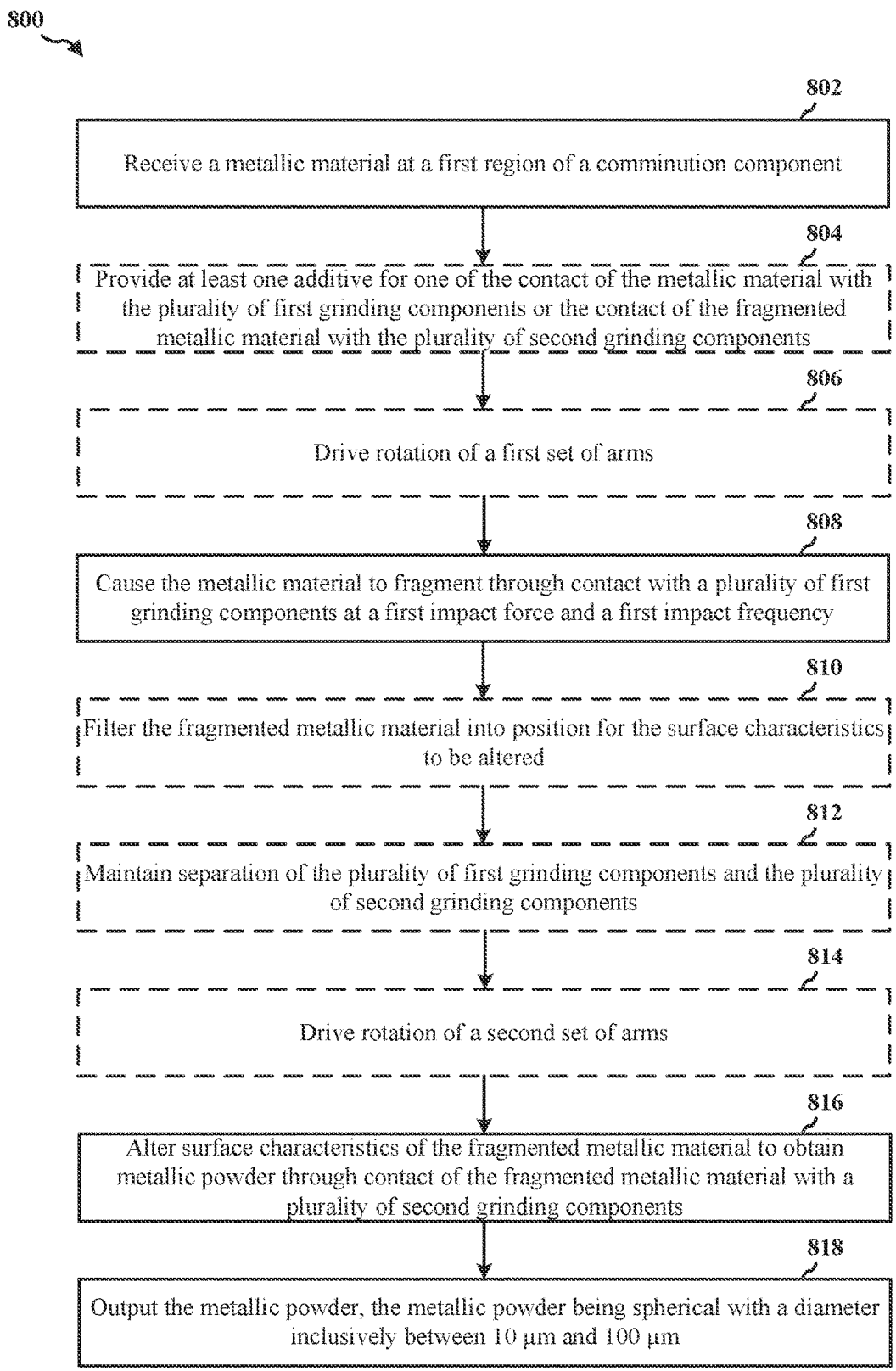
FIG. 8 illustrates a flowchart of an example method for creating metallic powder using continuous ball milling.

FIG. 8 illustrates a method 800 for creating metallic powder using continuous ball milling, in accordance with various embodiments of the present disclosure. The method may be implemented by a ball mill (e.g., ball mill 400, 500, 600, 700) and/or a computer system (e.g., computer system 450), which may be connected to a ball mill. According to various embodiments, one or more of the illustrated operations may be transposed, omitted, and/or contemporaneously performed. In various embodiments, operations shown in dashed-lined boxes may be optional.

Initially, a metallic material is received at a first region of a comminution component (operation 802). The comminution component may include at least a first region having a plurality of first grinding components arranged therein and a second region having a plurality of second grinding components arranged therein. Within the comminution component, the metallic material may by fragmented by contact with the plurality of first grinding components when in the first region, and the fragmented metallic material may have morphology altered by contact with the plurality of second grinding components when in the second region.

In some embodiments, at least one additive may be provided for one of the contact of the metallic material with the plurality of first grinding components or the contact of fragmented metallic material with the plurality of second grinding components (operation 804). For example, the at least one additive may be configured to prevent cold welding of the metallic powder, prevent coagulation of the metallic powder, lubricate the metallic powder, modulate impact frequency with the metallic powder, increase energy transfer with the metallic powder, or prevent chemical hardening of the metallic powder.

In some embodiments, rotation of a first set of arms positioned at the first region within the comminution component may be driven (operation 806). The metallic material may be fragmented based on the rotation of the first set of arms. The metallic material is fragmented through contact with the plurality of first grinding components at a first impact force and a first impact frequency (operation 808).

The fragmented metallic material may be filtered into position for surface characteristics of the fragmented metallic material to be altered (operation 810). Further, separation of the plurality of first grinding components and the plurality of second grinding components may be maintained (operation 812).

In some embodiments, rotation of a second set of arms positioned at the second region within the comminution component may be driven (operation 814). Surface characteristics of the fragmented metallic material may be altered to obtain metallic powder based on the rotation of the second set of arms. The surface characteristics of the fragmented metallic material are altered through contact with the plurality of second grinding components at a second impact force lower than the first impact force and a second impact frequency higher than the first impact frequency (operation 816).

Metallic powder is then output, and the metallic powder is spherical with a diameter inclusively between 10 μm and 100 μm (operation 818).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for producing a metallic powder through grinding, the apparatus comprising:
a comminution component including an inlet to receive a metallic material at a first region within the comminution component and an outlet to dispense the metallic powder from a second region within the comminution component;

a plurality of grinding components to grind the metallic material, the plurality of grinding components being arranged within the comminution component;

a drive component, connected with the comminution component, to induce movement of the metallic material and the plurality of grinding components within the comminution component such that the metallic material is fragmented through contact with the plurality of grinding components at the first region within the comminution component and an external surface of the fragmented metallic material is altered at the second region within the comminution component to produce the metallic powder; and a computer system configured to:
  detect at least one condition within the first region or the second region of the comminution component, and
  adjust, based on the at least one condition within the first region, a second temperature in the second region such that the second temperature is different from a first temperature in the first region, or
  adjust, based on the at least one condition within the second region, a first temperature in the first region such that the first temperature is different from the second temperature in the second region.

2. The apparatus of claim 1, wherein the plurality of grinding components comprises a set of first grinding components and a set of second grinding components, and each first grinding component has at least one of a greater weight or a larger dimension than each second grinding component.

3. The apparatus of claim 2, wherein the first grinding components are comprised of a different material than the second grinding components.

4. The apparatus of claim 2, wherein the set of first grinding components is spatially separated from the set of second grinding components within the comminution component.

5. The apparatus of claim 4, wherein an interior of the comminution component is configured with one of a conical shape or geometric walls to spatially separate the first set of grinding components from the second set of grinding components.

6. An apparatus for producing a metallic powder through grinding, the apparatus comprising:

a comminution component including an inlet to receive a metallic material at a first region within the comminution component and an outlet to dispense the metallic powder from a second region within the comminution component, wherein the comminution component is configured such that a first temperature at the first region is different by at least 20 degrees Celsius (° C.) than a second temperature at the second region;

a plurality of grinding components to grind the metallic material, the plurality of grinding components being arranged within the comminution component; and a drive component, connected with the comminution component, to induce movement of the metallic material and the plurality of grinding components within the comminution component such that the metallic material is fragmented through contact with the plurality of grinding components at the first region within the comminution component and an external surface of the fragmented metallic material is altered at the second region within the comminution component to produce the metallic powder.

7. The apparatus of claim 6, wherein the first temperature is less than or equal to −100° C., and the second temperature is greater than or equal to 100° C.

8. The apparatus of claim 1, wherein the drive component comprises at least one shaft defining an axis of rotation of the comminution component.

9. The apparatus of claim 8, wherein an aspect ratio of the at least one shaft is different at the first region than at the second region.

10. The apparatus of claim 1, wherein the comminution component is configured to receive at least one additive at the first region or the second region.

11. The apparatus of claim 10, wherein the at least one additive comprises one or more of a surfactant, a lubricant, an abrasive, silica, stearic acid, and graphene.

12. The apparatus of claim 1, wherein each grinding component comprises a ball having a diameter inclusively between one (1) millimeter (mm) and 40 mm.

13. The apparatus of claim 1, further comprising:
  one or more filters or sieves between the first region and the second region, the one or more filters or sieves being configured to allow the fragmented metallic material to pass from one of the first region or the second region toward another of the first region or the second region and being further configured to prevent at least one grinding component from passing from one of the first region or the second region toward another of the first region or the second region.

14. The apparatus of claim 1, further comprising:
  a set of arms arranged within the comminution component and configured to affect at least one of force or frequency of contact between at least a portion of the plurality of grinding components and the fragmented metallic material.

15. The apparatus of claim 14, wherein each arm is connected with at least one of the drive component or interior surface of the comminution component, and each arm is configured to rotate to affect the at least one of the force or the frequency of the contact between the at least the portion of the plurality of grinding components and the fragmented metallic material.

16. The apparatus of claim 1, wherein the at least one condition is one of a size, a dimension, or morphology of the metallic material.

17. The apparatus of claim 1, further comprising at least one sensor connected with the computer system and configured to provide information about the metallic material within the first region or the second region to the computer system.

18. The apparatus of claim 1, wherein the comminution component comprises at least one channel or injection point in fluid communication with the first region or the second region for introducing a substance into the first region or the second region.

19. The apparatus of claim 1, wherein the second temperature is lower than the first temperature.

20. The apparatus of claim 1, wherein the comminution component further comprises a third region including a third temperature, and
  wherein the computer system is configured to adjust the third temperature such that the third temperature is different from the second temperature or the first temperature.

21. A method of producing powder through grinding, comprising:
   receiving, by an inlet of a comminution component, a metallic material at a first region of the comminution component;
   arranging a plurality of grinding components within the comminution component to grind the metallic material;
   introducing, by a drive component connected with the comminution component, movement of the metallic material and the plurality of grinding components such that the metallic material is fragmented through contact with the plurality of grinding components at the first region within the comminution component and an external surface of the fragmented metallic material is altered at a second region within the comminution component to produce the metallic powder;
   detecting, by a computer system, at least one condition within the first region or the second region;
   adjusting, by the computer system and based on the at least one condition within the first region, a second temperature in the second region such that the second temperature is different from a first temperature in the first region, or
   adjusting, by the computer system and based on the at least one condition within the second region, a first temperature in the first region such that the first temperature is different from a second temperature in the second region; and
   dispensing, by an outlet of the comminution component, the metallic powder from the second region of the comminution component.

22. The method of claim 21, wherein the at least one condition is one of a size, a dimension, or morphology of the metallic material.

23. The method of claim 21, further comprising:
   providing, by at least one sensor connected with the computer system, information about the metallic material within the first region or the second region to the computer system.

24. The method of claim 21, wherein the second temperature is lower than the first temperature.

25. The method of claim 21, wherein the adjusting includes controlling the first temperature such that the first temperature is different by at least 20 degrees Celsius (° C.) from the second temperature.

26. The method of claim 21, wherein the first temperature is less than or equal to −100° C., and the second temperature is greater than or equal to 100° C.

27. The method of claim 21, wherein the comminution component further comprises a third region including a third temperature, the method comprising:
   adjusting, by the computer system, the third temperature such that the third temperature is different from the second temperature or the first temperature.

28. The method of claim 21, wherein the plurality of grinding components comprises a set of first grinding components and a set of second grinding components, and each first grinding component has at least one of a greater weight or a larger dimension than each second grinding component.

29. The apparatus of claim 28, wherein the set of first grinding components is spatially separated from the set of second grinding components within the comminution component.

30. The method of claim 28, wherein the first grinding components are comprised of a different material from the second grinding components.

31. The method of claim 28, further comprising:
   forming an interior of the comminution component with a conical shape or geometric walls to separate the first set of grinding components from the second set of grinding components.

32. The method of claim 21, further comprising:
   filtering, by one or more filters or sieves between the first region and the second region, to allow the fragmented metallic material to pass from one of the first region or the second region toward another of the first region or the second region and to prevent at least one grinding component from passing from one of the first region or the second region toward another of the first region or the second region.

33. The method of claim 21, wherein each grinding component comprises a ball having a diameter between one (1) millimeter (mm) and 40 mm.

34. The method of claim 21, further comprising:
   arranging a set of arms within the comminution component and the set of arms are configured to affect at least one of force or frequency of contact between at least a portion of the plurality of grinding components and the fragmented metallic material.

35. The method of claim 34, further comprising:
   connecting each arm with at least one of the drive component or an interior surface of the comminution component, and each arm is configured to rotate to affect the at least one of the force or the frequency of the contact between the at least the portion of the plurality of grinding components and the fragmented metallic material.

36. The method of claim 34, wherein the set of arms includes a first set of arms and a second set of arms, wherein a speed of the rotation of the first set of arms is different from a speed of the rotation of the second set of arms.

37. The method of claim 21, further comprising:
   providing at least one additive at the first region or the second region.

38. The method of claim 37, wherein the at least one additive comprises one or more of a surfactant, a lubricant, an abrasive, silica, stearic acid, and graphene.

39. The method of claim 37, wherein the at least one additive is configured to prevent welding of the metallic powder, prevent coagulation of the metallic powder, lubricate the metallic powder, modulate impact frequency with the metallic powder, increase energy transfer with the metallic powder, or prevent chemical hardening of the metallic powder.

40. The method of claim 21, wherein the drive component comprises at least one shaft defining an axis of rotation of the comminution component.

41. The method of claim 40, wherein an aspect ratio of the at least one shaft is different at the first region than at the second region.

42. The method of claim 21,
   forming at least one channel or injection point in the comminution component such that the at least one channel or the injection point is in fluid communication with the first region or the second region; and
   introducing a substance into the first region or the second region.

* * * * *